US008856310B2

(12) United States Patent
Norden et al.

(10) Patent No.: US 8,856,310 B2
(45) Date of Patent: Oct. 7, 2014

(54) ACORN: PROVIDING NETWORK-LEVEL SECURITY IN P2P OVERLAY ARCHITECTURES

(75) Inventors: Samphel Norden, West Orange, NJ (US); Katherine H. Guo, Scotch Plains, NJ (US)

(73) Assignee: Alcatel Lucent, Boulogne Billancourt (FR)

(*) Notice: Subject to any disclaimer, the term of this patent is extended or adjusted under 35 U.S.C. 154(b) by 2048 days.

(21) Appl. No.: 11/316,150

(22) Filed: Dec. 22, 2005

(65) Prior Publication Data
US 2007/0149279 A1 Jun. 28, 2007

(51) Int. Cl.
*G06F 15/173* (2006.01)
*H04L 29/06* (2006.01)
*H04L 12/24* (2006.01)
*H04N 21/222* (2011.01)
*H04H 20/63* (2008.01)

(52) U.S. Cl.
CPC ............... *G06F 15/173* (2013.01); *H04L 29/06* (2013.01); *H04L 12/2419* (2013.01); *H04N 21/2223* (2013.01); *H04H 20/63* (2013.01)
USPC ...................................................... 709/224

(58) Field of Classification Search
CPC ... G06F 15/173; H04L 29/06; H04L 12/2419; H04N 21/2223; H04H 20/63
USPC .......................................... 463/42; 709/224
See application file for complete search history.

(56) References Cited

U.S. PATENT DOCUMENTS

| | | | |
|---|---|---|---|
| 6,965,674 B2 * | 11/2005 | Whelan et al. ................ 380/270 |
| 7,215,659 B1 * | 5/2007 | Chen et al. .................... 370/338 |
| 7,277,546 B2 * | 10/2007 | Dhawan ........................ 380/269 |
| 7,367,888 B1 * | 5/2008 | Chen et al. ...................... 463/42 |
| 7,417,959 B2 * | 8/2008 | Dorner et al. ................. 370/260 |
| 7,467,415 B2 * | 12/2008 | Carter ............................. 726/27 |
| 7,502,354 B1 * | 3/2009 | Maufer .......................... 370/338 |
| 2002/0123345 A1 * | 9/2002 | Mahany et al. ............... 455/432 |
| 2004/0024871 A1 * | 2/2004 | Kitchin ......................... 709/225 |
| 2004/0047351 A1 * | 3/2004 | Del Prado Pavon et al. ........................... 370/395.4 |
| 2004/0133913 A1 * | 7/2004 | Benveniste .................... 725/81 |
| 2004/0242321 A1 * | 12/2004 | Overton ......................... 463/29 |
| 2005/0094581 A1 * | 5/2005 | Giloi et al. ................... 370/260 |
| 2005/0135318 A1 * | 6/2005 | Walton et al. ................ 370/338 |
| 2005/0149728 A1 * | 7/2005 | Saffre .......................... 713/166 |
| 2005/0185633 A1 * | 8/2005 | Shigei .......................... 370/352 |
| 2005/0193143 A1 * | 9/2005 | Meyers et al. ............... 709/238 |
| 2005/0216519 A1 * | 9/2005 | Mayo et al. .................. 707/200 |
| 2005/0237993 A1 * | 10/2005 | Hong et al. ................... 370/349 |
| 2005/0271019 A1 * | 12/2005 | Yuan et al. ................... 370/338 |

(Continued)

OTHER PUBLICATIONS

Bjorn Knutsson, Honghui Lu, Wei Xu, and Bryan Hopkins, "Peer-to-peer support for massively multiplayer games," IEEE INFOCOM, Apr. 2004.

(Continued)

*Primary Examiner* — Ondrej Vostal
(74) *Attorney, Agent, or Firm* — Wall & Tong, LLP

(57) ABSTRACT

To address the problem of providing network-based security to mitigate and detect cheating in peer-to-peer (P2P) gaming architecture, an architecture suite called architectures with coordinator obfuscation for resilient P2P gaming networks (ACORN) is presented that uses a combination of low overhead, per-packet access authentication, moving-coordinator and cheat detection mechanisms to effectively mitigate security threats.

20 Claims, 17 Drawing Sheets

(56) References Cited

U.S. PATENT DOCUMENTS

| | | | | |
|---|---|---|---|---|
| 2005/0273613 | A1* | 12/2005 | Dellmark et al. | 713/176 |
| 2006/0059565 | A1* | 3/2006 | Green et al. | 726/27 |
| 2006/0200862 | A1* | 9/2006 | Olson et al. | 726/23 |
| 2006/0294413 | A1* | 12/2006 | Filz et al. | 714/4 |
| 2007/0004419 | A1* | 1/2007 | Ji et al. | 455/447 |
| 2007/0197877 | A1* | 8/2007 | Decorte et al. | 600/300 |
| 2007/0263635 | A1* | 11/2007 | Garg | 370/395.4 |
| 2008/0288878 | A1* | 11/2008 | Hayashi et al. | 715/762 |

OTHER PUBLICATIONS

C. Riley and C. Scheideler, "Guaranteed broadcasting using spon: Supervised p2p overlay network," Int. Zurich Seminar on Communication.

Ion Stoica, Robert Morris, David Karger, Frans Kaashoek, and Hari Balakrishnan, "Chord: A Scalable Peer-to-peer Lookup Service for Internet Applications," Proc. of ACM SIGCOMM, Aug. 2001.

Sylvia Ratnasamy, Paul Francis, Mark Handley, Richard Karp, and Scott Shenker, "A scalable content-addressable network," Proc. of Conf. on Applications, technologies, architectures and protocols for computer comm., pp. 161-172, 2001.

Ben Zhao, Ling Huang, Jeremy Stribling, Sean Rhea, Anthony Joseph, and J. Kubiatowicz, "Tapestry: A resilient global-scale overlay for service deployment," Proc. of IEEE Journal on Selected Areas in Comm.

Antony Rowstron and Peter Druschel, "Pastry: scalable, decentralized object location and routing for large-scale peer-to-peer systems," Proc. of 18th IFIP/ACM Int. Conf. on Distributed Systems Platforms, Nov. 2001.

John R. Douceur, "The sybil attack," in Proc. of the 1st International Workshop on Peer-to-Peer Systems (IP2PS), Mar. 2002.

Bram Cohen, "Incentives build robustness in bittorrent," Workshop on Economics of Peer-to-Peer Systems, Jun. 2003.

"Workshop on economics of peer-to-peer systems, http://www.sims.berkeley.edu/p2pecon/," 2005.

Margaret DeLap, Bjorn Knutsson, Honghui Lu, Oleg Sokolsky, Usa Sammapun, and Insup Lee, "Is runtime verification applicable to cheat detection," Proc. of Network and System Support for games (NETGAMES), Aug. 2004.

Aaron St.John and Brian Levine, "Supporting p2p gaming when players have heterogeneous resources," NOSSDAV, Jun. 2005.

Nathaniel Baughman and Brian Levine, "Cheat-proof playout for centralized and distributed online games," IEEE INFOCOM, pp. 104-113, Apr. 2001.

Angelos Keromytis, Vishal Mishra, and Dan Rubenstein, "SOS: Secure overlay services," Proc. of ACM SIGCOMM, Aug. 2002.

Vincent Scarlata, Brian N. Levine, and Clay Shields, "Responder Anonymity and Anonymous Peer-to-Peer File Sharing," in Proc. of the 9th International Conference on Network Protocols (ICNP), Nov. 2001.

Miguel Castro, Michael Jones, Anne-Marie Kermarrec, Antony Rowstron, Marvin Theimer, Helen Wang, and Alec Wolman, "An evaluation of scalable application-level multicast built using peer-to-peer overlays," Proc. of IEEE INFOCOM, Apr. 2003.

"Terazona: Zona application framework white paper," Zona Inc. ,http://www.zona.net/whitepaper/Zonawhitepaper.pdf, 2002.

"Even balance inc., Punkbuster, http://www.punkbuster.com," 2005.

"Unitedadmins.com, http://www.unitedadmins.com/cdeath.php," 2005.

Chris Gauthier-Dickey, Daniel Zappala, Virginia Lo, and James Marr, "Low latency and cheat-proof event ordering for peer-to-peer games," NOSSDAV, Jun. 2004.

M. Reed, P. Syverson, and D. Goldschlag, "Proxies for Anonymous Routing," in Proc. of the 12th Annual Computer Security Applications Conference (ACSAC). Dec. 1996, pp. 95-104, IEEE.

Clay Shields and Brian N. Levine, "A protocol for anonymous communication over the internet," in Proc. of the 7th ACM Conference on Computer and Communication Security (ACM CCS), Nov. 2000.

Michael K. Reiter and Aviel D. Rubin, "Crowds: Anonymity for web transactions," ACM Transactions on Information and System Security, vol. 1, No. 1, pp. 66-92, Nov. 1998.

Li Xiao, Zhichen Xu, and Xiaodong Zhang, "Mutual anonymity protocols for hybrid peer-to-peer systems," in Proc. of the 23rd International Conference on Distributed Computing Systems (ICDCS), May 2003.

Debojyoti Dutta, Ashish Goel, Ramesh Govindan, and Hui Zhang, "A distributed rating scheme for p2p systems," in Proc. of Workshop on Economics of P2P Systems, Jun. 2003.

Stefan Saroiu, Steven Gribble, and Henry Levy, "Measurement and analysis of spyware in a university environment," First Symposium on Networked Systems Design and Implementation (NSDI '04), Mar. 2004.

"Malware: Malicious software, http://www.malware.com/," 2005.

"Rsa security inc., http://www.rsasecurity.com/products/securid," 2005.

Zongkai Yang, Weimin Lang, and Yunmeng Tan, "A new fair micropayment system based on hash chain," in Proc. of IEEE International Conference on e-Technology, e-Commerce and e-Service (EEE'04), 2004, pp. 139-145.

C. Tang and P. K. Mckinley, "On the cost-quality tradeoff in topology-aware path probing," Proc. of ICNP, Nov. 2003.

N. Duffield, "Simple Network Performance Tomography," Proc. of Internet Measurement Conference (IMC), Oct. 2003.

P. Ferguson and D. Senie, "Network ingress filtering: Defeating denial of service attacks which employ IP source address spoofing," RFC 2827, 2000.

Checkpoint Inc, "Firewall-1," http://www.checkpoint.com, 2005.

"Sony online entertainment, http://everquest2.station.sony.com,".

Nathan Sheldon, Eric Girard, Seth Borg, Mark Claypool, and Emmanuel Agu, "The effect of latency on user performance in warcraft iii," Proc. of Network and System Support for games (NETGAMES), May 2003.

* cited by examiner

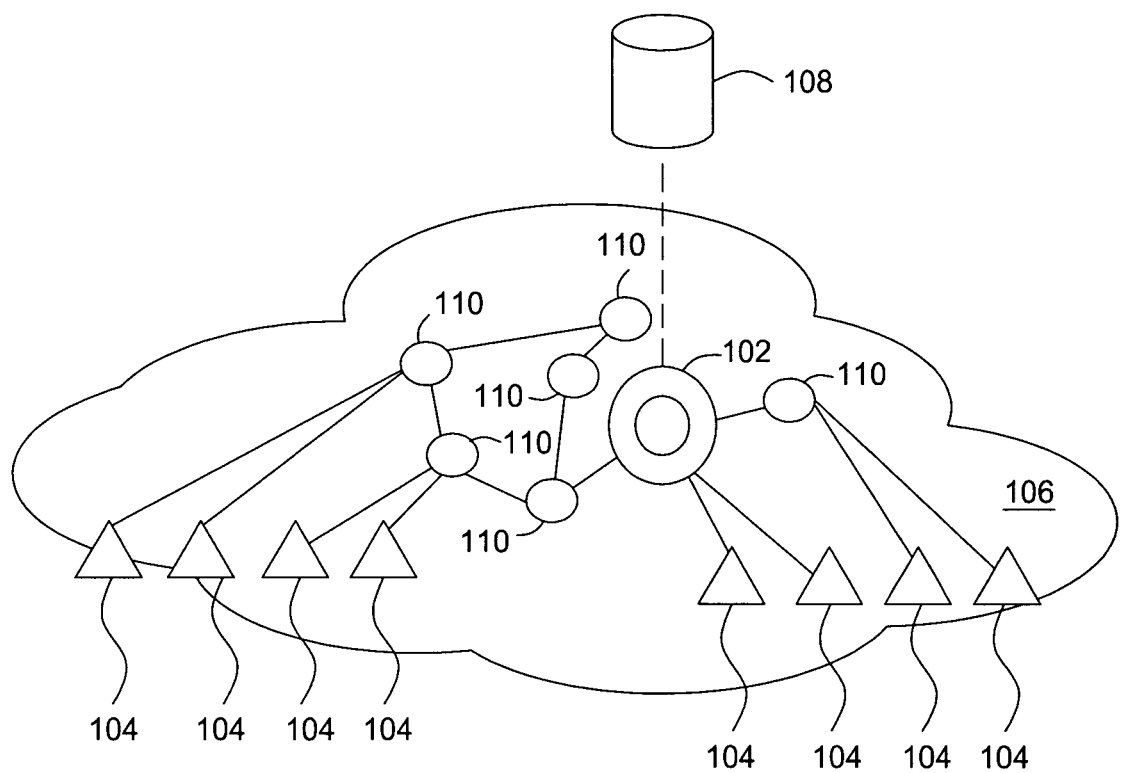
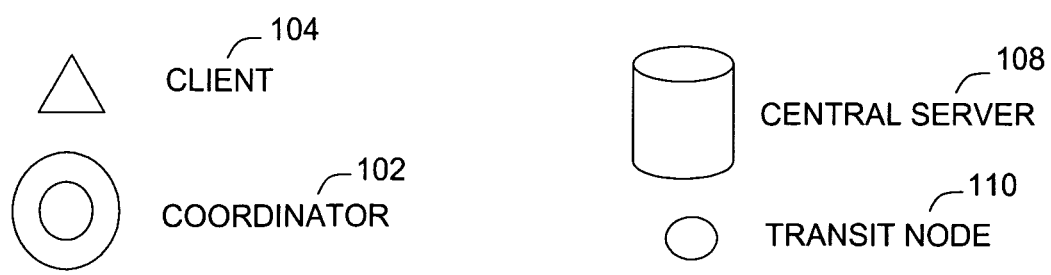
FIG. 1

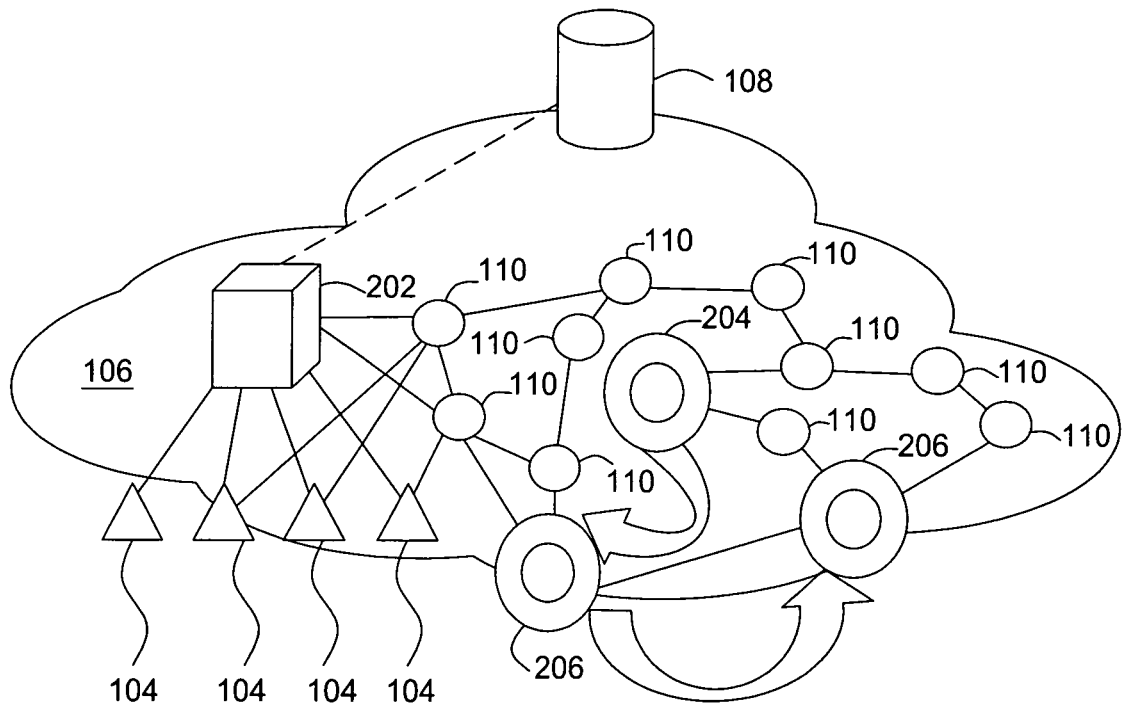
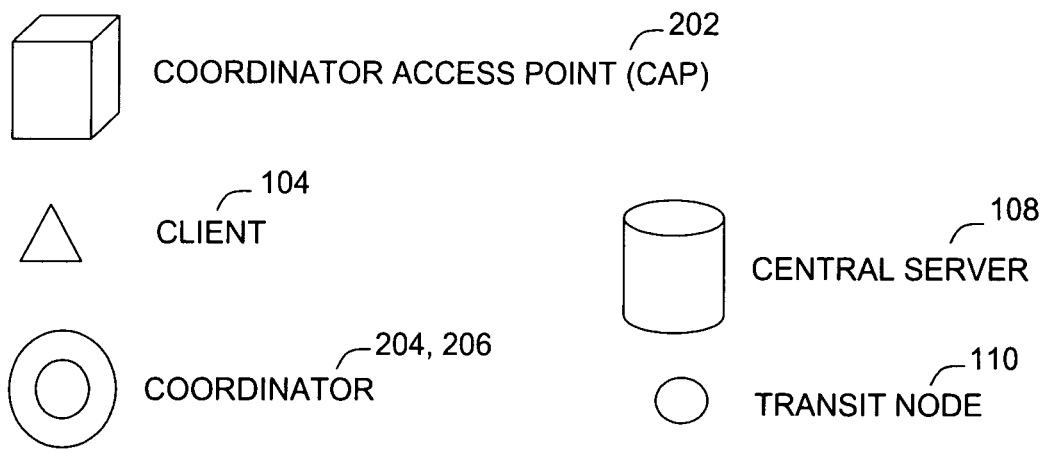
FIG. 2

400

500

ACORN: PROVIDING NETWORK-LEVEL SECURITY IN P2P OVERLAY ARCHITECTURES

FIELD OF THE INVENTION

The present invention relates generally to the fields of security, gaming, and networks and, in particular, relates to cheating, peer-to-peer (P2P) networks, P2P games, and overlay networks.

BACKGROUND OF THE INVENTION

An increasingly popular type of peer-to-peer (P2P) architecture is a coordinator-based one whereby the coordinator for a group of clients increases the efficiency of the P2P architecture in applications such as massively-multiplayer online games. Prior security research in P2P networks has focused on providing disincentives for clients to cheat or has relied on mechanisms such as distributed hash tables and self-organizing networks to be resilient to denial-of-service (DoS) attacks. None of the prior research work handles the case when the coordinator itself is compromised and can cheat, which is a scenario akin to cheating by the network or a majority of the clients.

SUMMARY

Various deficiencies of the prior art are addressed by various exemplary embodiments of the present invention of methods and systems for providing network-based security in P2P gaming architectures.

One embodiment is a method for providing network-based security. Coordinator functionality is moved between members of a set of candidate coordinator nodes in a network, without notifying a plurality of clients in the network. The frequency that the coordinator functionality is moved is flexibly tuned, depending on whether the network is highly fluctuating and whether there is low overhead for moving the coordinator functionality. Another embodiment is a computer readable medium storing instructions for performing this method.

Another embodiment is a system for providing network-based security, including a central server, a number of clients, a current coordinator, and a coordinator access point (CAP). The central server provides a plurality of services, such as gaming services. The clients are capable of connecting to the central server to access one of the services and may join and leave the network. The current coordinator has the coordinator functionality in the network and receives update messages from the clients and communicates the update messages to the clients. The CAP is responsible for moving the coordinator functionality between members of a set of candidate coordinator nodes in the network and the CAP is responsible for cheat detection.

BRIEF DESCRIPTION OF THE DRAWINGS

The teachings of the present invention can be readily understood by considering the following detailed description in conjunction with the accompanying drawings, in which:

FIG. 1 is a block diagram showing an exemplary embodiment of a static coordinator-based peer-to-peer (P2P) architecture;

FIG. 2 is a block diagram showing an exemplary embodiment of a moving coordinator architecture (ACORN);

To facilitate understanding, identical reference numerals have been used, where possible, to designate identical elements that are common to the figures.

DETAILED DESCRIPTION OF THE INVENTION

Figure 3:
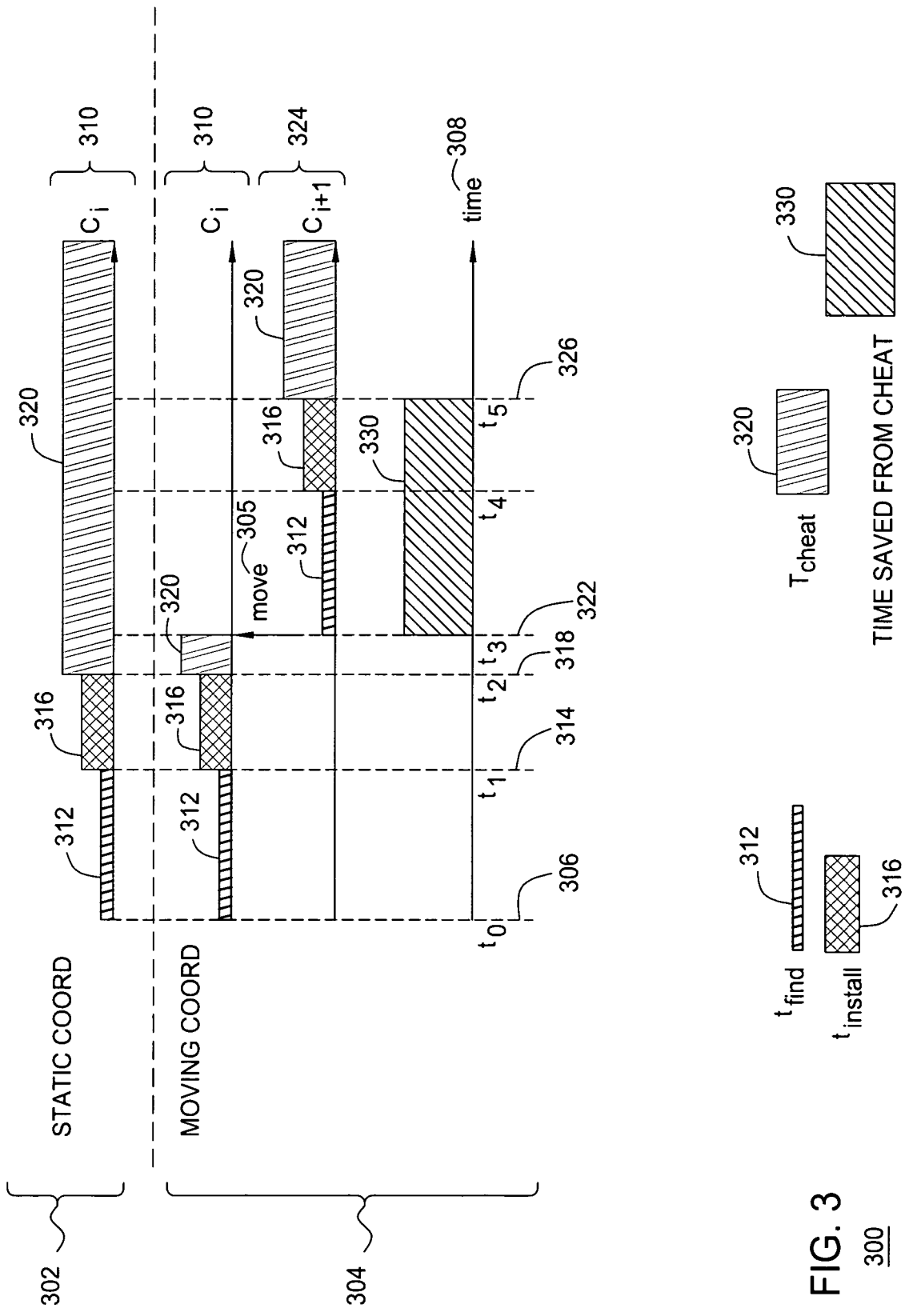
FIG. 3 is a chart comparing a move event for the static coordinator architecture and the moving coordinator architecture (ACORN)

The present invention will be primarily described within the general context of embodiments of methods and system for providing network-based security in peer-to-peer (P2P) gaming architectures. However, those skilled in the art and informed by the teachings herein will realize that the invention is applicable generally to security applications, cheating, P2P networks, P2P games, overlay networks, and not only P2P gaming architectures, but any P2P architecture that uses coordinators. The present invention has many other applications, such as war games and voice over Internet Protocol (IP) (VoIP). For example, in VoIP, coordinators route voice packets. A malicious coordinator might, for example, drop some packets in favor of other packets, allowing a buddy to get preferential service.

Introduction

To address the problem of providing network-based security to mitigate and detect cheating in peer-to-peer (P2P) gaming architecture, an exemplary embodiment of an architecture suite called architectures with coordinator obfuscation for resilient P2P gaming networks (ACORN) is presented that uses a combination of low overhead, per-packet access authentication, moving-coordinator and cheat detection mechanisms to effectively mitigate security threats.

P2P architectures are becoming increasingly ubiquitous for several reasons, including resiliency from failures due to a totally distributed design as well as flexibility and diversity in the applications that can be supported. One such application is the massively-multiplayer online game (MMOG). Most P2P architectures use special nodes that may or may not be P2P clients themselves for performing special actions in order to improve efficiency and scalability, while also providing some amount of accounting and security. These special nodes are called coordinators. In a MMOG, coordinators are used to collect state updates from players in a local region and disseminate game state to all players in the region.

One exemplary embodiment concerns coordinator-based P2P gaming architecture where the coordinator can be compromised. Compromised means either when the coordinator cheats or is under a denial-of-service (DoS) attack. A cheat refers to a scenario where some entities illegally take control of P2P nodes to either passively observe protected information (referred to as a passive cheat) or actively engage in malicious activities (referred to as an active cheat). A DoS attack refers to some entities overloading resources on P2P nodes, essentially disrupting services provided by these nodes. The defense for coordinators against this category of compromise is referred to as network-based security. The terms client and player are synonymous and the term node refers to any entity that participates in the P2P network, including players, coordinators, and transit nodes that participate in P2P routing. The enforcement of security in a P2P architecture is complicated by factors such as dynamically fluctuating network membership combined with the fact that P2P nodes are not to be trusted due to their public nature.

In this exemplary embodiment, ACORN moves the coordinator functionality around the network so as to prevent the compromise of a single coordinator node from disrupting the P2P MMOG. This makes for a more adaptive architecture as compared to the static coordinator-based schemes, where, once a coordinator is compromised, the system is compromised during the lifetime of the coordinator. With ACORN, the coordinator's identity is frequently obfuscated to an attacker, making it very difficult for a compromised coordinator to cause sustained damage to the network. However, it is impossible to prevent compromise in a distributed P2P network due to the lack of control over the participants. Thus, in the event that a coordinator is compromised, exemplary embodiments of methods called K-window and checkpointing detect an actively cheating coordinator.

This exemplary embodiment has many advantages. The P2P coordinator-based architecture is scalable and secure. It prevents unauthorized traffic using a per-packet authentication mechanism with negligible overhead, while also being adaptive under different operating scenarios, from highly fluctuating to relatively static P2P networks. This approach is adaptive to gaming application constraints and provides a complete spectrum of operation from high performance to high security. The architecture suite and techniques provide not only cheat detection and mitigation, but also enhanced resiliency to DoS attacks due to the proactive nature of moving coordinators. Prior work has only considered the case when a P2P client cheats or behaves in a selfish manner to improve its own performance. The typical approach to handle this includes using distributed trust, rating and reputation based mechanisms. However, when a coordinator cheats, this is akin to the server cheating (in a client-server architecture) or similar to the case when a majority of clients cheat and has not been previously addressed.

Problem Formulation

The problem is securing a coordinator-based P2P architecture that is vulnerable to both passive and active cheating as well as DoS attacks. Exemplary embodiments of the ACORN architecture detect cheats and mitigate DoS attacks. There is a trade-off between security and performance. Accordingly, exemplary embodiments provide a range of mechanisms within the ACORN framework that may be deployed based on the particular performance and security concerns of different applications.

A. Network Model

FIG. 1 shows an exemplary embodiment 100 of a static coordinator-based P2P architecture. A MMOG is used as an example to illustrate the coordinator-based P2P architecture. In this coordinator-based P2P gaming topology, a fixed coordinator 102 collects player update information and disseminates it to all the clients 104 (players). Because of the static nature of the coordinator, it is called a static coordinator-based P2P architecture. The network 106 includes a central server 108 and P2P nodes 102, 104, 110. There are three types of P2P nodes: the clients 104 (players), the coordinator 102, and the transit nodes 110.

The central server 108 is responsible for providing the initial authentication and other accounting services for supporting the game. Players 104 initially connect to the central server 108 to gain access to the game. The central server 108 is also responsible for resynchronizing the game state when a coordinator fails, because there is insufficient time to transfer the state from the failed coordinator to the new coordinator.

The clients 104 (players) participate in a game. A typical multiplayer game has game objects, such as food and weapons where players 104 perform actions such as eating food, picking up weapons, moving around, and interacting with other players 104. The player 104 updates other players within its area of influence, called the local region, regarding its current position and its action on game objects. The player 104 does so by sending its current position and action on game objects to the coordinator 102. The coordinator 102, in turn, multicasts the position update and object update to all the players 104 within the local region. The players 104 interact with each other by sending unicast messages directly among themselves. Each player 104 is represented by a P2P node of type client 104 that can leave and join the network, characterizing the "churn" rate. The clients 104 can also be elected as a coordinator 102 in certain scenarios where they have sufficient processing power and bandwidth. The clients 104 are also assumed to fail with a certain probability as a result of a DoS attack, device failure, or other failures. The network 106 uses a distributed hash table (DHT) based mechanism for coordinator 102 location.

The coordinator 102 is a type of P2P node that is responsible for receiving and disseminating player updates. The coordinator 102 is either a participant in the game or functions as a dedicated device. This is referred to as the static coordinator architecture where there is a single coordinator 102 managing all the players 104 in its region as shown in FIG. 1. A coordinator 102 is elected before the beginning of a quest to allow players 104 to participate and complete the quest in a smooth manner. It is possible for coordinators 102 to leave and join as well and this requires a transfer of state information between the leaving coordinator 102 and the newly elected coordinator. The coordinator 102 is dynamically replicated once a failure is detected. In addition, at least one replica is up to prevent losses. Each coordinator 102 is associated with an identity or a key which is used to route packets to that coordinator 102. The transit node 110 is used for P2P routing. The transit node 110 may also be a player 104 or a coordinator 102 at any given time.

Compromise Model

In the coordinator-based P2P gaming architecture, the coordinator 102 can be compromised by, for example, cheating or being the target of a DoS attack. Consider one local region where one coordinator 102 is in charge of the clients 104 within the region. In a compromise model, both cheats and DoS attacks are affected by attackers. The attacker can either be any client 104, any coordinator 102 of this or another region, or any other network entity. Because the identity of the coordinator 102 is known, because clients 104 contact the coordinator 102 efficiently, it is reasonably assumed that the attacker is aware of the identity of the coordinator 102. There are two scenarios that can result from an interaction between the attacker and the coordinator 102: (1) the attacker causes the coordinator 102 to cheat or (2) the attacker launches one or more DoS attacks against the coordinator 102.

In the scenario where the attacker causes the coordinator 102 to cheat, the attacker launches a spyware or malware software program that is inadvertently accessed by the coordinator 102. At one extreme, the attacker may be able to gain control of the operating system using malware to conduct active cheats. At the other extreme, passive cheats are conducted by using spyware to view messages that are transmitted or received by the coordinator 102. A variant of this scenario is when the attacker itself is a coordinator 102. This is possible because a random node can be elected as coordinator 102. As a result, not only can an attacker legitimately know about all the states of the clients 104, including their location and current status, but also the attacker can send false updates to one or more of the clients 104, which would succeed because there is no way for a client 104 to verify whether its update is correct.

In the second scenario, the attacker launches a DoS attack against the coordinator 102. This is the easiest attack given the proliferation of successful DoS attacks on major sites, including Yahoo, CNN, and Google. The attacker can launch a distributed DoS attack by compromising hundreds of thousands of nodes to simply flood a server, (in this example the coordinator 102), with junk traffic that the coordinator 102 attempts to process and fail. The attacker can also launch a malware, such as Trojan horses or worms to disrupt a coordinator 102.

In one embodiment of the ACORN architecture, $T_{cheat}$ is the time during which a coordinator 102 can conduct either a passive or an active cheat and $T_{act}$ is the time during which a coordinator 102 conducts active cheats. When a coordinator 102 has been compromised to cheat passively or actively, one objective is to minimize $T_{cheat}$. This problem is addressed by moving the coordinator functionality among different clients 104 such that the time during which the coordinator cheats ($T_{cheat}$) is limited to the duration from the beginning of the cheat to the time that the functionality was moved. One benefit of moving is reducing the time the coordinator 102 is under congestion or under DoS attacks. When a coordinator 102 is actively cheating, one objective is to minimize $T_{act}$. This problem is addressed by a method for active cheat detection.

Moving Coordinator: Architecture and Algorithms

Various embodiments minimize $T_{cheat}$, use a moving coordinator 102 scheme, and have architectures that explore different dimensions of the security-performance tradeoff.

ACORN Architecture

In one embodiment, the coordinator functionality is moved among candidate coordinator 102 nodes.

FIG. 2 shows an exemplary embodiment 200 of a moving coordinator architecture (ACORN). The moving coordinator architecture introduces a new type of node called a coordinator access point (CAP) 202. FIG. 2 also shows a single region with one active coordinator 204 among a set of candidate coordinators 206. One benefit of ACORN is analogous to hitting a moving target. If the target, (i.e., the active coordinator 204 in this case), keeps moving, given that it takes time to aim at the target, it is likely that by the time the attacker aims, the target has already moved. This makes it difficult, if not impossible to attack the active coordinator 204. It is possible that the target will not always have moved in time, due to the associated overhead. However, in general, the result is a reduced $T_{cheat}$.

In both the static coordinator architecture of FIG. 1 and the moving coordinator architecture of FIG. 2, the change of coordinator can be triggered by either a fail or a leave event. A fail event is the failure of the active coordinator 204. A leave event is the leaving of the active coordinator 204. In this exemplary embodiment 200, a scheduled coordinator move will also trigger a coordinator change. As a result, the moving coordinator architecture of FIG. 2 results in a reduced $T_{cheat}$ compared to the static coordinator architecture of FIG. 1.

To quantitatively describe the benefits of this exemplary embodiment 200 of the moving coordinator architecture, the following time intervals are used: $t_{find}$, $t_{lost}$, and $t_{move}$. One benefit is reducing $T_{cheat}$, when an attacker compromises the active coordinator 204 to cheat. The time interval for an attacker to locate a new coordinator is $t_{find}$, which can be very short, if the attacker masquerades as a regular client and the architecture allows the identity of the coordinator 204, 206 to be revealed to the clients 104. The time interval for an attacker to cause the coordinator to cheat is $t_{install}$. For example, this is the time to install a spyware program to enable passive cheats or the time to install a malware program to enable active cheats. The time interval for the network to detect a coordinator failure is $t_{lost}$. The failure may be due to a DoS attack, for example. The time interval between two consecutive coordinator moves is $t_{move}$.

Figure 4:
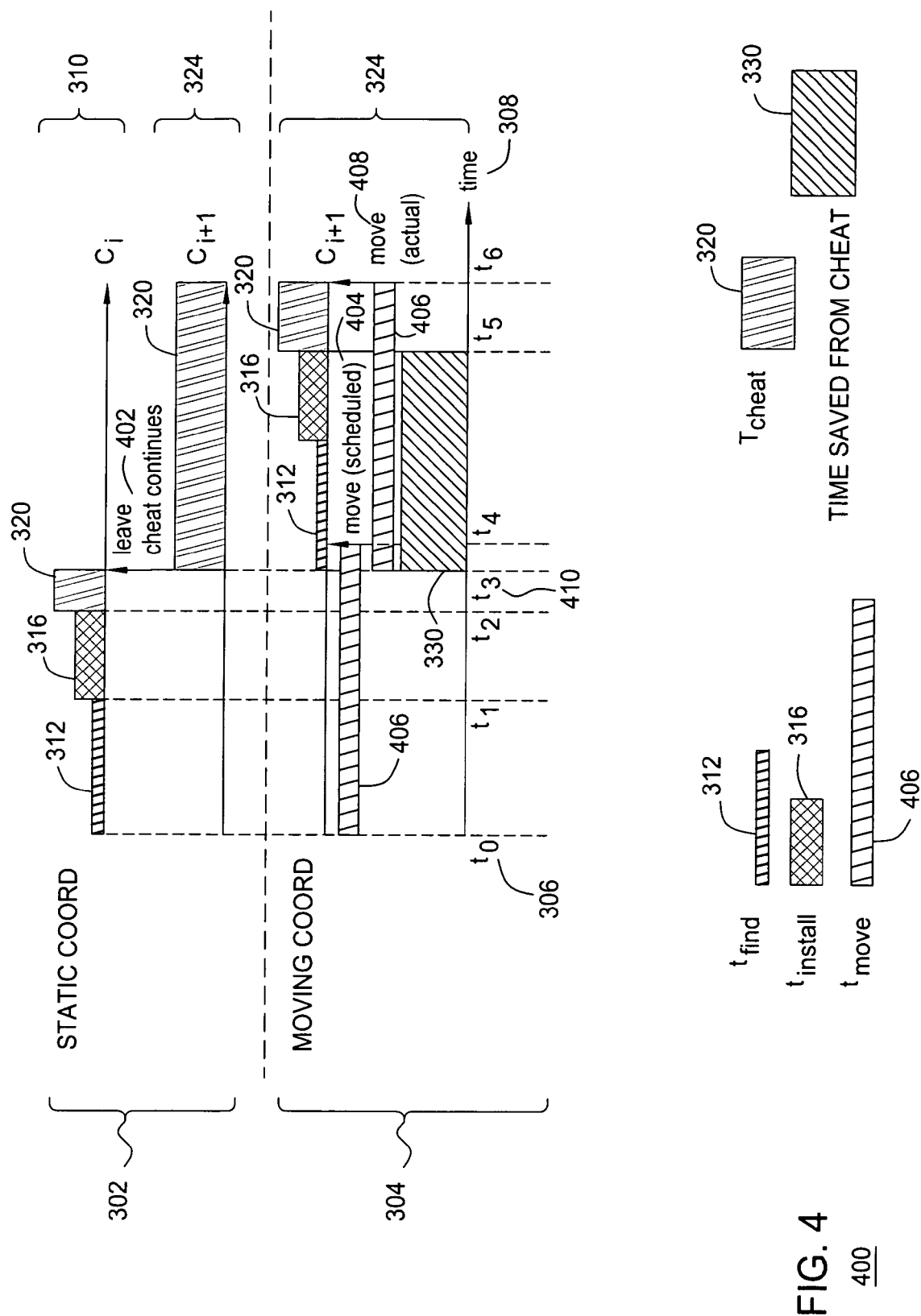
FIG. 4 is a chart comparing a leave event for the static coordinator architecture and the moving coordinator architecture (ACORN)
Figure 5:
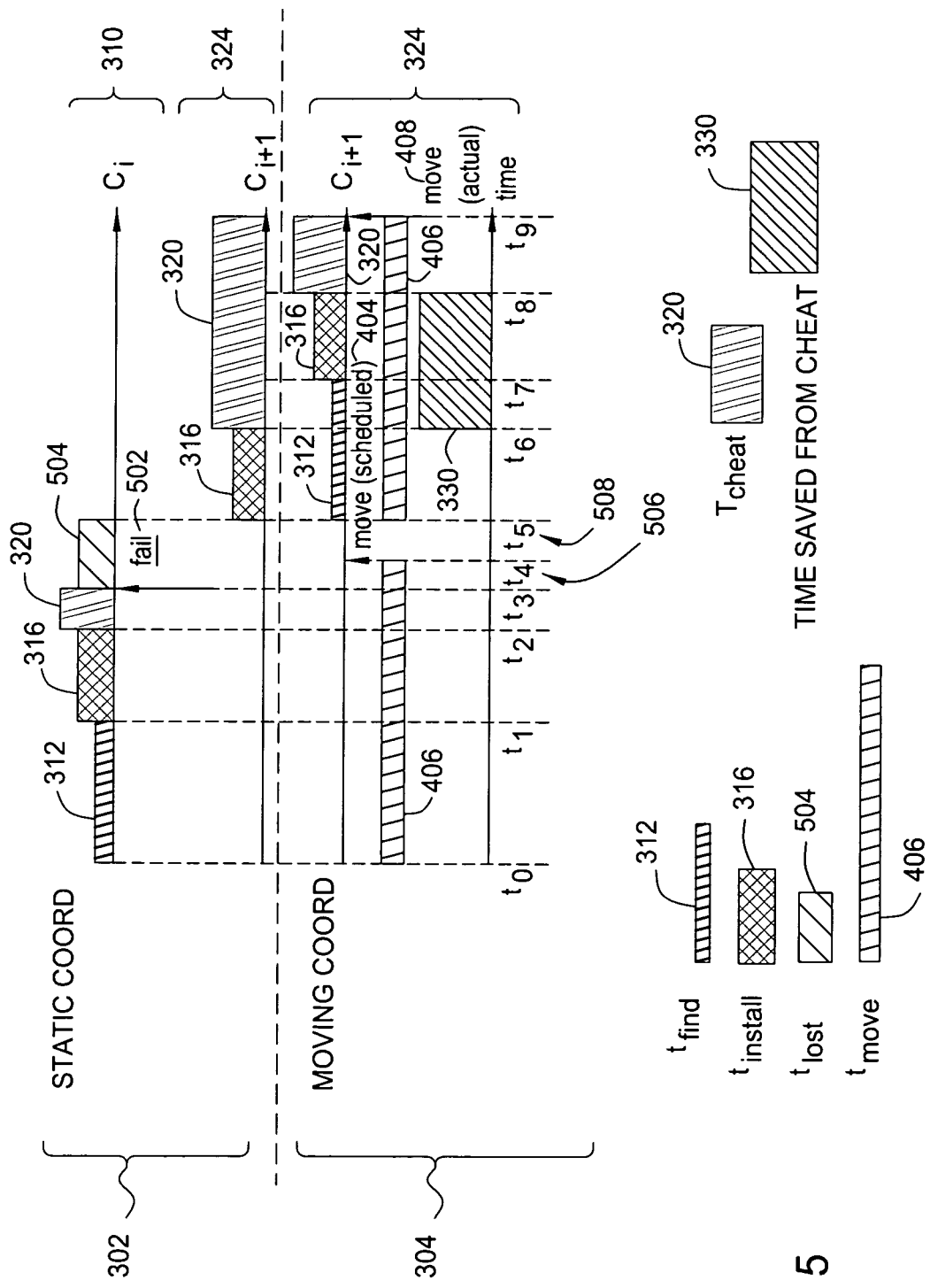
FIG. 5 is a chart comparing the fail event for the static coordinator architecture and the moving coordinator architecture (ACORN)

FIGS. 3-5 illustrate the benefits of exemplary embodiments of the moving coordinator architecture (ACORN) for move, leave, and fail events.

FIG. 3 is a chart 300 comparing a move event 305 for the static coordinator architecture 302 and the moving coordinator architecture (ACORN) 304. Periodically, the coordinator functionality in ACORN moves from the current node to another candidate coordinator. This is a move event 305. When this happens, the attacker needs some time to find a new coordinator to compromise to cheat. In FIG. 3, at time $t_0$ 306 along the time axis 308, the attacker starts to look for the current coordinator $C_i$ 310. After $t_{find}$ 312, at time $t_1$ 314, the attacker starts to install spyware or malware on $C_i$ 310. After $t_{install}$ 316, at time $t_2$ $C_i$ 318 is compromised and can start cheating. In the static coordinator architecture 302, the cheat continues during cheat time 320 if $C_i$ 310 does not fail or leave. In ACORN 304, a move 305 is scheduled, for example, at time $t_3$ 322, to move 305 the coordinator to $C_{i+1}$ 324. Only after $t_{find}$ 312 plus $t_{install}$ 316 from this move 305, at time $t_5$ 326, can the new coordinator, $C_{i+1}$ 324, be compromised to cheat. Therefore, each move event 305 saves $t_{find}$ 312 plus $t_{install}$ 316 from $T_{cheat}$ 320 equals the time saved from cheat 330.

FIG. 4 is a chart 400 comparing a leave event 402 for the static coordinator architecture 302 and the moving coordinator architecture (ACORN) 304. The leave event 402 has no impact on an attack in the static coordinator architecture 302. In the static coordinator architecture 302, as the current coordinator $C_i$ 310 leaves 402 and the new coordinator $C_{i+1}$ 324 takes over, the attacker can continue compromising ($T_{cheat}$ 320) the new coordinator $C_{i+1}$ 324 without interruption, because the new coordinator $C_{i+1}$ 324 is chosen before the leave 402 happens and the new coordinator $C_{i+1}$ 324 is well known to every node including the attacker. This is called an extended cheat. However, in the moving coordinator architecture (ACORN) 304, the attacker needs to spend $t_{find}$ 312 to find the new coordinator $C_{i+1}$ 324 and spend $t_{install}$ 316 to install the spyware or malware before it can begin compromising to cheat ($T_{cheat}$ 320). Essentially, there is no extended cheat and $T_{cheat}$ 320 is reduced by $t_{find}$ 312 plus $t_{install}$ 316. The move event in ACORN is scheduled periodically with $t_{move}$ 406 as the interval between two consecutive moves. However, this periodic nature is disturbed by the leave event 402. Whenever a leave event 402 happens, the starting point for the period $t_{move}$ 406 to reach the next move event is reset to the time $t_3$ 410 of the leave event 402, instead of the previous move event to 306. This is done because a leave event will result in a coordinator move and any scheduled move not triggered by a leave event should only happen $t_{move}$ 406 after the previous move event.

FIG. 5 is a chart comparing the fail event 502 for the static coordinator architecture and the moving coordinator architecture (ACORN). Similar to the leave event 402, the fail event 502 also disrupts the periodic nature of the scheduled move event 404 ($t_{move}$ 406), but unlike the leave event 402, the fail event 502 causes $t_{lost}$ 504. The move scheduled 404 at $t_4$ 506 using the time instance $t_5$ 508 when the failure 502 is discovered to be the start of the next $t_{move}$ 406 interval.

ID Sequence Generation

One exemplary embodiment of ACORN provides the client 104 the ability to generate an ID sequence. The clients 104 in ACORN execute a hash-chain mechanism with a seed that is distributed to all the clients 104. The idea is to generate a sequence of numbers based on the starting seed value. The numbers are unique with a high degree of probability. Each such number in the chain is an ID. The next step is to map the ID number generated by the hash-chain to the address of the current coordinator 204 in a transparent manner, without requiring updates to be sent to every client 104 whenever a coordinator 204 moves. As the ID number changes at periodic intervals (as determined by the frequency of coordinator moves), so does the identity of the coordinator 204. This results in moving the coordinator 204.

Coordinator Access Point (CAP) 202

One exemplary embodiment of ACORN includes the CAP 202 as shown in FIG. 2. The clients 104 send all the update messages to the CAP 202 in addition to the coordinator 204. The CAP 202 acts as a trusted intermediary between client 104 and the coordinator 204. The role of the CAP 202 differs in different embodiments. In one embodiment, the CAP 202 is distributed for scalability reasons as well as resiliency. In all embodiments, the CAP 202 manages a fixed number of coordinators 204, 206 over several regions. CAP 202 may be responsible for coordinators 204, 206 that manage players (clients) 104 in the west coast of the U.S., for example. FIG. 2 presents an example of ACORN 200 where the CAP 202 is in charge of one local region with one current coordinator 204 for the region.

ACORN Operation

Figure 6:
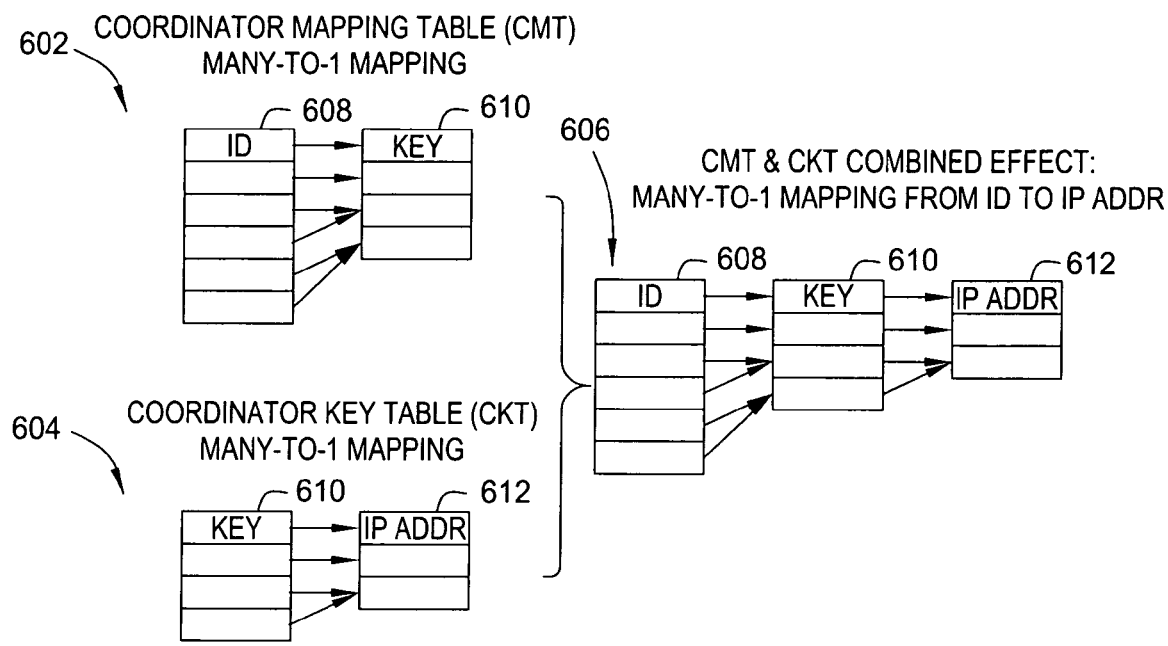
FIG. 6 is a block diagram showing an exemplary embodiment of the combined effect of the coordinator mapping table (CMT) and the coordinator key table (CKT)

FIG. 6 shows an exemplary embodiment 600 of the combined effect 606 of the coordinator mapping table (CMT) 602 and the coordinator key table (CKT) 604. One exemplary embodiment of ACORN includes a hash table called a coordinator mapping table (CMT) 602. The CMT 602 has two columns. Each entry in the left column designates a range of ID sequence numbers 608 and the entry in the corresponding right column is a key 610 that the range 608 maps to. The key 610 is used by the standard P2P routing mechanisms to forward messages. Every node 204, 206, 104, 110 (see FIG. 2) is associated with a range of keys 610 the node 202, 204, 206, 104, 110 that is associated with a given key 610 is found by the transit nodes 110. Thus, the mapping of the ID 608 to the key 610 using the CMT 602 is then used by the transit nodes 110 that perform routing to eventually map the key 610 to an IP address 612.

One exemplary embodiment includes a method of selecting a coordinator 204, 206. The first step to enable ACORN functionality is to select the coordinators 204, 206 for inclusion in a coordinator candidate set, $C_{set}$. The CAP 202 performs the selection using a variety of mechanisms. Candidates can be selected randomly or selected based on performance of their network links, for example, tested using probing or tomography-based mechanisms. In order to utilize the benefit of P2P routing, the CAP 202 assigns a unique set of keys 610 to each coordinator in $C_{set}$ and stores the many-to-one mapping between the keys 610 and coordinators 204, 206 in the CKT 604. The many-to-one mapping is intended for further obscurity to increase the difficulty for a malicious entity to figure out the number coordinators 204, 206 currently in the network 106 from the CMT 602.

In this exemplary embodiment, the CAP 202 takes the following three steps to enable communication between clients 104 and coordinators 204, 206. First, the CAP 202 constructs the CMT 602 and multicasts the CMT 602 to all the clients 104. Second, the CAP 202 generates a seed and multicasts the seed to all the clients 104. Third, the CAP 202 populates the underlying P2P network 106, specifically the transit nodes 110, with the one-to-one mapping stored in the CKT 604 between keys 610 and IP addresses 612 of the coordinators 204, 206 in $C_{set}$.

In this exemplary embodiment, the seed is then used by each client 104 to generate a sequence of ID numbers 608 as time passes. The many-to-one mapping from the ID sequence numbers 608 to keys 610 in the CMT 602 combined with the current ID sequence number generated by the client 104 uniquely determines the key for the current coordinator 204. The clients 104 do not know the IP address 602 of the current coordinator 204. Instead, the clients simply use the derived key to forward messages to the current coordinator 204 using the underlying P2P routing mechanism. One advantage of this mechanism is that, apart from the initial seed and CMT 602 that is communicated in a secure manner between the CAP 202 and a given client 104, the sequence is generated in an autonomous manner, requiring no further interaction between the two entities.

In this exemplary embodiment, with a fixed seed, fixed CMT 602, and fixed CKT 604, as time passes, a sequence of IDs are generated by the hash chain at each client 104 and each ID 608 is mapped to a coordinator 204, 206 in $C_{set}$. As the ID 608 changes with time, the current coordinator 204 within $C_{set}$ changes periodically.

In this exemplary embodiment, in order to disturb the predictability of the mapping from the seed to the coordinator 204, 206 IP address 602 at any given time, the CAP 202 can optionally change the seed, change the CMT 602, and change the CKT 604 periodically. The CAP 202 also keeps track of coordinators 204, 206 that are not active anymore and insert new candidates into the $C_{set}$. The CAP 202 needs to send keep-alive messages to all coordinators 206 within $C_{set}$, other than the currently active coordinator 204. One embodiment improves security by having the CAP 202 periodically force certain coordinators 204, 206 out and insert new coordinators 204, 206, effectively changing the group membership of $C_{set}$.

Routing

In this exemplary embodiment, at any given instant, there is only one active coordinator 204, which can be reached using a specific set of keys 610 that are populated by the CAP 202 to the transit P2P nodes 110 that perform routing. One embodiment improves security by having the CAP 202 populate the appropriate key 610 for the next coordinator 206 just before the coordinator transition. In one embodiment, the CAP 202 populates all the keys 610 for optimized processing. One disadvantage of having the CAP 202 populate all the keys 610 is that this opens the architecture 200 to attacks. If a majority of transit P2P nodes 110 are compromised or collude, then the identity of the entire $C_{set}$ would be known.

Bootstrapping

In this exemplary embodiment, the CAP 202 initially multicasts the CMT 602 and the seed to all the clients 104. The actual mapping of keys 610 to IP addresses 602 is transparent to ACORN and is a result of coordinators 204, 206 that join or leave the network 106, resulting in the CAP 202 refreshing and updating of keys 610. The P2P forwarding mechanisms automatically forward packets to that coordinator 204 due to the self-organizing nature of these overlay networks. As the P2P nodes 202, 204, 206, 104, 110 join and leave, the self-organizing nature of the routing mechanisms allow a fast convergence to a stable forwarding topology.

Run-Time

In this exemplary embodiment, one operation at each client is to generate ID numbers periodically and generate packets with the appropriate key 610 jointly decided by the current ID number 608 and the CMT 602. In addition, the CAP 202 performs the following operations. The CAP 202 optionally changes the seed and shuffles the CMT 602. The CMT 602 is then multicast to all clients 104 as well as the coordinators 204, 206. The CAP 202 optionally changes the CKT 604 and populates the transit nodes in the underlying P2P network 106 with the CKT 604. The CAP 202 performs cheat detection verification. The CAP 202 updates a newly elected coordinator 204 with the set of valid client 104 IP addresses. This prevents clients 104 that have left the network 106 from unauthorized access. The CAP 202 performs client 104 registration. The clients 104 register and de-register with the CAP 202 when they join or leave the game. In effect, the CAP 202 also behaves as the central server 108 for providing initial access to the game network 106.

Client Leaving or Failing

In this exemplary embodiment, if a normal client 104 (i.e., one that is not in $C_{set}$) leaves the game, then it is not necessary for the CAP 202 to change the CMT 602. However, the IP address of the leaving client 104 is made available to the current coordinator 204 as part of the deregistration process. In a non-P2P client-server architecture, a leaving client normally deregisters with the central server, which, in ACORN, is the CAP 202. Thus, the current coordinator 204 knows about the clients 104 that have left the game. Future packets from any client 104 that have left are ignored, because the IP address is not part of the allowed list. Clients 104 are monitored by keep-alive messages from the central server 108, which keeps track of client status and informs the CAP 202 if clients 104 fail for de-registration purposes.

Instances of ACORN

Two different instances of ACORN that vary in how they tradeoff performance with security. At one extreme, there is an exemplary embodiment of a distributed architecture named coordinator-choice that relies on the entire P2P community to make the moving decision independently. At the other extreme, there is an exemplary embodiment named CAP-choice that deals with a semi-centralized case where the decision-making is done by the CAP 202, shielding the coordinator 204, 206 from clients 104.

CAP-Choice

In this exemplary embodiment, the CAP 202 is the sole decision-making entity. The CAP 202 is responsible for associating a candidate coordinator 206 with one key 610 or a set of keys 610. Thus, when clients 104 generate a packet with a key 610, transit P2P nodes 110 forward the packet to the coordinator 204 that has been designated by the CAP 202. The CAP 202 selectively populates the P2P overlay 200 with certain keys 610 so as to only allow certain coordinators 204, 206 to be accessed. There are a number of benefits to this exemplary embodiment. Better performance is achieved in the sense that it avoids traffic to congested coordinators 204, 206 that could be under DoS attacks. Enhanced security is achieved, because a malicious or compromised coordinator 204, 206 does not receive any traffic due to it being de-listed by the CAP 202.

Coordinator-Choice

In the previous exemplary embodiment, the CAP 202 could become a single point of failure. Instead of using implementation work-arounds, such as distributing CAP functionality on multiple nodes or using protective architectures, this exemplary embodiment uses a semi-distributed instance. In this exemplary embodiment, the CAP 202 elects a coordinator 204 and hands over decision-making to the coordinator 204, while also providing the coordinator 204 with the current $C_{set}$. The current coordinator 204, when leaving or moving, is responsible for populating the keys 610 associated with the next coordinator 206 that it chooses based on similar reasons of performance and security as the CAP-choice instance. In effect, the CAP functionality moves along with the coordinator 204, 206. When the current coordinator 204 fails, the CAP 202 is still responsible for electing a new coordinator 206 and de-listing the failed coordinator 204. The CAP 202 also updates the $C_{set}$ with the current coordinator 204, whenever other coordinators in $C_{set}$ leave or fail.

One advantage of the coordinator-choice instance is that there is no obvious single point of failure and any vulnerability lasts only for the duration of the move interval, $t_{move}$. It is possible, however, for a malicious or compromised coordinator 204, 206 to become elected. Subsequent moves could be restricted by the malicious coordinator to its own buddy set. However, this exemplary embodiment allows detection of active cheats. This results in a similar de-listing of the malicious coordinator 204, 206 by the CAP 202 and the election of a new coordinator 206.

Some Benefits of ACORN

Exemplary embodiments of ACORN has many benefits and advantages over the prior art, such as per-packet authentication, transparent moving, load sensitive moving, and defending against attacks, such as client-initiated attacks, transit node-initiated attacks, coordinator-initiated attacks, collusion-based attacks, coordinator correlation attacks, and attacks exploring the vulnerability of the CAP 202.

Per-Packet Authentication

Because all legitimate clients 104 can generate the next ID 608 independently and insert it into their data packets, it is easy for the coordinator 204 to verify if the client 104 is legitimate simply by looking at the combination of the client 104 IP address and the ID 608. An unauthorized client 104, without using a proper seed, will not be able to generate the right combination to insert its packets into the network 106. This reduces the impact of the distributed DoS attacks, because an attacker will need to obtain a valid CMT 602 for each and every one of its bots (i.e., compromised nodes) in order to generate a valid packet. Consider the scenario where a client that was legitimately authenticated leaves and, then, tries to send packets, without re-registering with the CAP 202. In this case, such packets are never allowed, because the CAP 202 de-lists the IP address of such clients 104. At periodic intervals, the CAP 202 also changes the CMT and only valid clients are allowed to receive the updated CMT. For situations where the clients use spoofed IP addresses, the use of anti-spoofing techniques can prevent such unauthorized access. For example, the service provider that is hosting the game normally has a stateful firewall that uses anti-spoofing techniques on all packets.

Transparent Moving

The objective of moving coordinator functionality is achieved transparently, without clients 104 even knowing. Because the ID 608 changes without communication between clients and any server, clients are always able to reach the current coordinator 204, provided a legitimate ID 608 is used.

Load Sensitive Moving

In ACORN, it is possible to move the coordinator based on impending congestion at the coordinator 204, 206, in a normal overload scenario or in abnormal DoS floods.

Defending Against Client-Initiated Attacks

In client-initiated attacks, a client 104 is compromised by some attacker and starts cheating. This can be detected and handled by cheat mitigation mechanisms at the application-level and protocol-level using prior art. Furthermore, the CMT 602 provided to all clients 104 only allows the client 104 to derive a key 610. The client 104 has no knowledge of the IP address 612 of the coordinator 204, 206, making it difficult to launch a direct attack.

Defending Against Transit Node-Initiated Attacks

It is possible that a client node 104 is also a transit node 110. In such a case, the client 104 has access to the routing table used in the P2P routing mechanisms. This provides client 104 information only about the next hop that would be used in order to lookup a particular key 610 and not the final destination. The intrinsic redirection mechanism of the routing mechanism makes it harder for the client 104 to launch a direct attack again. The use of different routes for each packet also deflects any DoS flooding based attacks that can be launched by the client 104 to the current coordinator 204.

Defending Against Coordinator-Initiated Attacks

In coordinator-initiated attacks, the current coordinator 204 is attacked and starts cheating. This is detected by cheat detection and intrinsically handled by the moving coordinator mechanism. A coordinator 206 that is not currently active can also launch a DoS attack on the active coordinator 204. The moving of coordinator functionality helps mitigate this attack.

Defending Against Collusion-Based Attacks

Consider the collusion attack where a majority of coordinators 204, 206 collude and can cheat or launch the analogous Sybil attack, where a single attacker takes control of a large number of coordinators 204, 206. The selection of coordinators 204, 206 by the CAP 202 is done periodically. The frequency of the selection increases the resilience of the architecture to attacks when a whole group of coordinators 204, 206 collude. In combination with the cheat detection mechanisms, the coordinator candidate set $C_{set}$ is re-selected, if it appears that a majority of coordinators 204, 206 are compromised. In the more difficult case of coordinators 204, 206 colluding with clients 104 to defeat the detection mechanisms, the CAP 202 performs the coordinator selection mechanism more frequently.

Defending Against Coordinator Correlation Attacks

The coordinator correlation attack is specifically aimed at the moving coordinator architecture. An attacker passively keeps track of the chain or sequence of the coordinators 204, 206 by being a legitimate client 104. Then, the attacker attacks the chain on the second round, as soon as the sequence ends, either by launching a spyware or malware or by DoS floods. In the CAP-choice and coordinator-choice instances, when clients 104 do not have a clue as to the identity of the attacker, such as attack is difficult. Furthermore, the larger the number of coordinators in the $C_{set}$, the greater the delay for an attacker to observe the sequence. Another complication for the attacker is that, in ACORN, the CAP 202 changes the seed, the CMT 602 or the CKT 604 effectively changes the entire $C_{set}$ and forces the attacker to start from scratch. Thus, with a reasonable number of coordinators 204, 206 and a reasonably-spaced seed change, it is nearly impossible for the attacker to launch this attack. Lastly, the constant P2P membership churn also works against the attacker.

Defending Against Attacks Exploring the Vulnerability of the CAP

Some elements of ACORN are subject to attacks due to their centralized nature. In particular, the CAP 202 is centralized and considered a trusted entity. One question arises as to the vulnerability of the CAP 202 and whether the entire system breaks down as a result. First, the use of anonymity protocols is leveraged as well as resilient secure architecture to protect the CAP 202. Second, the CAP 202 does not bring any new vulnerability into the system that was not already present in the form of the central server vulnerability of the prior art.

Cheat Detection

Cheat detection is the solution to minimize the time for active cheat. Cheats are detected by finding inaccuracies in state update messages. The mechanism is to verify that update messages sent by the current coordinator 310 to the new coordinator 324 are uncorrupted. The scenario when clients 104 corrupt packets are covered by cheat detection mechanisms in the prior art that handle application-level and protocol-level cheating. In ACORN, active cheats conducted by the coordinators 204, 206 is the focus. The active cheat itself is manifested by a coordinator 204, 206 suppressing updates, modifying updates, or performing any of the protocol-level cheats that are devastating in this case, because the trusted coordinator 204, 206 itself perpetrates the cheat.

Two exemplary embodiments are tunable cheat detection mechanisms. Each offer different approaches to detecting cheats. The first exemplary embodiment is K-window, which is useful in scenarios when clients 104 cannot be trusted. The second exemplary embodiment is checkpointing, which is a distributed approach for when clients 104 collectively contribute in detecting cheats.

In these two exemplary embodiments, TS is defined as the total state that needs to be transferred whenever a coordinator 204, 206 leaves, fails, or moves. Δ is defined as the aggregate of each client's 104 update sent to the coordinator 204, 206 by unicast. Thus, in order to recreate the correct snapshot of the network 106 at time t, the coordinator 204 requires TS to be combined with all the Δ updates sent by all the clients 104 until time t. Because the CAP 202 is treated as a trusted replica of the coordinator, clients 104 send Δ's to both the CAP 202 and the coordinator 204. $C_{old}$ denotes the current coordinator, $C_{new}$ denotes the new one, and $N_{clients}$ denotes the total number of clients. $TC_{start}$ denotes the time that a coordinator starts to conduct an active cheat. $T_{act}$ denotes the time during which the coordinator conducts an active cheat, which is the time being minimized.

K-Window

Figure 7:
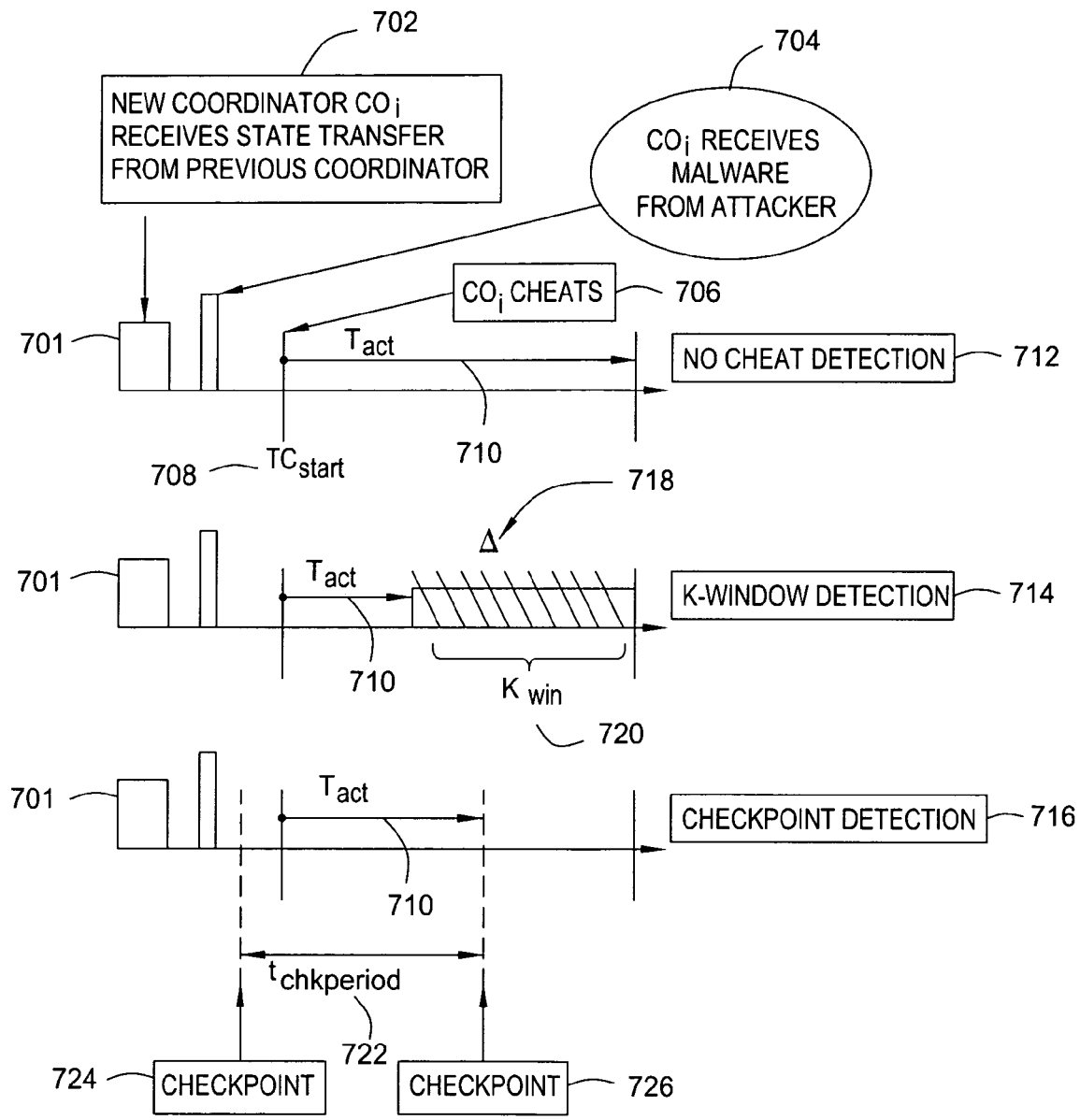
FIG. 7 is a block diagram showing a comparison of $T_{act}$ in three cases: (1) no cheat detection, (2) K-window detection, and (3) checkpoint detection.

In the K-Window exemplary embodiment, the general idea behind a cheat detection algorithm is for both the CAP 202 and $C_{old}$ to send to $C_{new}$ the Δ updates for some window of time ($K_{win}$) before the scheduled move from $C_{old}$ to $C_{new}$. The frequency of updates is $F_{win}$. The cheat is detected by $C_{new}$ if the following holds.

$$TS_{CAP} + \sum_{i=1}^{K_{win} \times F_{win}} \Delta_{CAP} <> TS_{C_{old}} + \sum_{i=1}^{K_{win} \times F_{win}} \Delta_{C_{old}} \quad (1)$$

where $TS_{CAP}$ is the state at the CAP 202, $\Delta_{CAP}$ is the update at the CAP 202, $TS_{C_{old}}$ is the state at the $C_{old}$, and $\Delta_{C_{old}}$ is the update at $C_{old}$. In general, the global state and the $\Delta$'s from the CAP 202 and $C_{old}$ are compared by $C_{new}$. If inequality (1) holds true, then the current coordinator, $C_{old}$, is cheating and will be removed from $C_{set}$ by the CAP 202. The operation of K-window is shown in FIG. 7.

Assume the cheat occurs sometime, $t_{detect} \leq K_{win}$, after the detection mechanism begins to operate. There is a burden of extra message overhead that is proportional to the size of $t_{detect}$. Generally, the additional overhead in bytes (over and above the cost of moving) is $$2 \times (t_{detect} \times F_{win}) \times \text{Size}(\Delta) \times N_{client} + TS \quad (2)$$

where Size($\Delta$) is the size of each $\Delta$ update in bytes. There are additional $\Delta$ update messages sent by both the CAP 202 and the old coordinator, $C_{old}$ during the window period as well as an extra TS transferred from the CAP 202 to $C_{new}$. Naturally, when a cheat occurs before the window, the first round of cheat detection messages is sufficient and the overhead is $$2 \times \text{Size}(\Delta) \times N_{client} + TS \quad (3)$$

Regarding the security of K-window, there is a vulnerability of relying on $C_{new}$ to do the verification. It is possible that $C_{new}$ could be colluding with $C_{old}$ and fail to report the violation. Alternately, $C_{new}$ might maliciously report $C_{old}$ as a cheating coordinator. To prevent this, one embodiment or variant of K-window simply relies on the CAP 202 to conduct all the verification. In this embodiment, the CAP 202 does not send any $\Delta$ to $C_{new}$. Instead, the CAP 202 receives the $\Delta$ from clients 104 as well as from $C_{old}$ and does the verification itself. The message overhead is simply $$(t_{detect} \times F_{win}) \times \text{Size}(\Delta) \times N_{client} \quad (4)$$

which is less than half of the overhead for the case where $C_{new}$ is conducting the cheat detection.

Checkpointing

The general idea behind checkpointing is to use the CAP 202 to periodically send a $\Delta$ (checkpoint) to all the clients 104. The clients 104 themselves verify if the $\Delta$ that they are getting from the current coordinator, $C_{old}$, is accurate and matches the $\Delta$ from the CAP 202. If it turns out that the current coordinator, $C_{old}$, is cheating, then all clients 104 automatically send their future $\Delta$'s to the CAP 202, which then picks a new coordinator, $C_{new}$. $\text{Chk}_{set}$ denotes the set of clients to which the checkpoints are sent by the CAP 202. In effect, each client checks whether the following inequality holds:

$$\Delta_{CAP} <> \Delta_{C_{old}} \quad (5)$$

If any client 104 in $\text{Chk}_{set}$ detects that the inequality holds, that client sends its next update exclusively to the CAP 202, while indicating the violation. The CAP 202 requires all members to concurrently indicate a violation. If there is an overall majority of such clients 104, then $C_{old}$ is labeled as a cheat and is subsequently removed from $C_{set}$.

The operation of checkpointing is shown in FIG. 7. $t_{chkpt}$ denotes the time instant for the next checkpoint event and $t_{chkperiod}$ denotes the interval between checkpoints and $t_{move-prev}$ denotes the time that the previous move event was scheduled. Basically, when the cheat is detected at the instant $TC_{start} \leq t_{chkpt}$, the overhead is given by $$\frac{(t_{chkpt} - t_{move}^{prev})}{t_{chkperiod}} \times \text{Size}(\Delta) \times |Chk_{set}| \quad (6)$$

given that the cheat was detected between $[t_{move}^{prev}, t_{move}]$. The tradeoff here is between checkpointing frequently, where longer $t_{chkperiod}$ means lower message overhead and security and where shorter $t_{chkperiod}$ means quicker detection and higher message overhead.

The checkpointing approach is more distributed in nature compared to the K-window approach. Relying on untrusted clients 104 could also be a problem, resulting in (1) false positives and (2) collusion of clients 104 leading to unnecessarily labeling an otherwise legitimate coordinator 204 as a cheating one. However, as before, this price needs to be weighed against the relatively reduced overhead. A variant of this approach to counter client collusion is to randomly pick a subset of clients for the CAP 202 to send the $\Delta$'s. As is the case for the K-window embodiment, the checkpointing embodiment can also be tuned based on network conditions by varying either $t_{chkperiod}$ and/or the cardinality of $\text{Chk}_{set}$.

Checkpointing vs. K-Window

FIG. 7 shows a comparison 700 of $T_{act}$ in three cases: (1) no cheat detection 712, (2) K-window detection 714, and (3) checkpoint detection 716.

Given that the coordinator is compromised and will start cheating, moving alone will not prevent cheating. To prevent the game from being disrupted, two cheat detection mechanisms are used: K-window and checkpointing.

For the no cheat detection 712 case, the new coordinator $Co_i$ receives state transfer information 701 from the previous coordinator. The $Co_i$ receives malware from an attacker 704 at $TC_{start}$ 708 and starts cheating at $TC_{start}$. This cheating will continue for $T_{act}$ 710 until the current coordinator moves, leaves, or fails without cheat detection.

For the K-window detection 714 case, update messages ($\Delta$) 718 are sent by CAP 202 and $C_{old}$ to $C_{new}$ during $k_{win}$ 720. In a game, every player, i.e., client 104, periodically sends an update message (i.e., a $\Delta$ 718) to the current coordinator, e.g., the player's position, state, and the like. Cheating can be detected from these update messages by comparing an update message sent by the old coordinator, $C_{old}$, to the update message sent by the CAP 202. If there is a mismatch, then the coordinator is cheating. The $k_{win}$ 720 signifies a window of time during which comparisons are being made of update messages ($\Delta$) 718. Thus, the new coordinator can detect if the old coordinator was cheating with the cooperation of the CAP 202. The $k_{win}$ 720 refers to that window of time when the new coordinator begins to receive the update ($\Delta$) 718. Thus, cheat detection can start from the left edge of the $k_{win}$ 720 period. If the attacker is already cheating, then the cheating time is minimized to the $T_{act}$ 710. The moment the update ($\Delta$) 718 arrives, a cheat can be detected.

For the checkpoint detection 716 case, a checkpoint 724 occurs before $TC_{start}$ 708 and another checkpoint 726 occurs after $TC_{start}$ 708, for the $t_{chkperiod}$ 722. The CAP 202 periodically receives update messages from a majority of the players and verifies whether they are consistent with the current game state. If the players do not agree with the current coordinator there is a mismatch in the game state. Periodically, (the interval is determined by $t_{chkperiod}$ 722), the CAP 202 receives the update messages from the players and uses them to determine whether the current coordinator is cheating.

In one exemplary embodiment, there are two different cheat detection mechanisms, K-window detection 714 and checkpoint detection 716. The checkpoint detection mechanism 716 is useful when the old coordinator and current coordinator are colluding. If they are colluding, cheat detection could potentially breakdown. To prevent this, the CAP 202 relies instead on the community of players by taking input from the players directly and not relying on the current coordinator. However, the players themselves may be cheating. Therefore, this exemplary embodiment can select the cheat detection mechanism to use at a particular time based on whether updates from coordinators or players are likely to be reliable. For example, if the current network load is low, updates from players may be relied upon. In a highly fluctuating network or when players are unreliable, then coordinators may be more reliable. Checkpoint detection 716 uses the information from the players, while K-window detection 714 uses information from the coordinator 204, 206.

Evaluation

One exemplary embodiment of ACORN was evaluated using realistic network models based on gaming applications. The performance of the moving versus the static coordinator cases was compared. The performance of detection mechanisms was evaluated.

Simulation Model

A particular instance of a MMOG was the basis for a network and traffic model. All clients 104 or players were located within a region that was based on the limited sensing capabilities of players. Each coordinator 204, 206 handled a region and evaluation focused on a single region. Clients were able to join and leave during a game session and were able to leave a given region. However, this did not affect the results, because the evaluation focused on the coordinator 204, 206 performance and it was assumed that the total population of clients 104 in the region remained constant, with the join and leave rates being equal. A coordinator 204, 206 itself was able to leave, fail, or, in ACORN, move.

During the session, clients 104 exchanged messages via the coordinator 204, 206. There are three types of messages in MMOGs: (1) player location update messages, (2) object update messages, and (3) player interaction messages. Player location update messages are sent by each client 104 to all the other clients 104 using multicast, where the coordinator 204, 206 is the root of the multicast tree. Object update messages are sent by each client 104 to the coordinator 204, 206 and multicast by the coordinator 204, 206 to all the other clients 104. Player interaction messages are sent by clients 104 to each other using multicast.

Realistic player behavior indicated that players eat and fight about every 20 seconds. Eat actions generated about 200 byte object update messages and fight actions generated player interaction message of about the same size. Players send about 200 byte position update messages about every 150 msec. This is considered an extremely heavy load that stresses the system, because about 99% of all the messages are for position updates. Whenever a coordinator 204, 206 left, the state was transferred from the old coordinator 204 to the new coordinator 206, requiring a transfer of maps, objects, user-specific parameters (e.g., position, health, interaction status with other players) and leading to around 12K bytes for a state transfer message for 1000 players. Large quests in MMOGs often took multiple hours to complete, with an average of about four to five hours. Five hours (i.e., 18,000 seconds) was chosen as the duration of the simulation. The other input parameters are shown in Table A and were based on statistics.

TABLE A

| Notation | Explanation (default value) |
|---|---|
| $t_{position}$ | Position update message interval (150 ms) |
| $t_{object}$ | Object update message interval (20 sec) |
| $t_{inter}$ | Player interaction message interval (20 sec) |
| $R_l$ | Coordinator leave rate (0.001 leaves per sec) |
| $R_f$ | Coordinator failure rate (0.0005 node failures per sec) |
| $p_{cheat}$ | Probability that a compromised coordinator 204, 206 cheat (0.25) |
| $t_{lost}$ | Time interval until failure is detected (550 ms) |
| $t_{find}$ | Time to find the coordinator 204, 206 to compromise (30 sec) |
| $t_{install}$ | Spyware or malware installation time (60 sec) |
| $t_{move}$ | Time interval between each coordinator 204, 206 move (10 min) |
| $T_{sim}$ | Total simulation time (5 hrs) |
| $N_{client}$ | Total number of clients in the local region (1000) |

The P2P network was simulated for one region consisting of 1000 client nodes and one coordinator 204 node. The node join, leave, and fail events were simulated using uniform random variables. To maintain a constant number of nodes, the join rate was made equal to the sum of the leave and fail rates. An attacker was expected to locate and install spyware or malware on a coordinator 204 whenever possible to cause the coordinator 204 to start cheating.

Failure of the coordinator can be caused due to operating system errors, or more likely, due to DoS attacks. The failure rate was varied to simulate the network at different stages of a DoS attack. The coordinator leave event caused coordinator and replica migrations and, therefore, state transfers in both the static and the moving coordinator schemes. In the first set of experiments, the effect of leave and fail rates on system security and message overhead was the focus.

The second set of experiments shed more light on the cheat detection mechanisms. Because cheat detection can only detect active cheats, active cheats were simulated by giving the attacker enhanced functionality, which did not end with passive cheating of a coordinator 204, 206. With some probability, $p_{cheat}=0.25$, the attacker caused the coordinator to actively cheat.

The list of output parameters is shown in Table B.

TABLE B

| Notation | Explanation (default value) |
|---|---|
| $C_{xfer\_COORD}$ | # Msgs from $C_{old}$ to $C_{new}$ |
| $C_{xfer\_CAP}$ | # Msgs from CAP to $C_{new}$ |
| $C_{cheat}$ | # Extra msgs due to cheat detection |
| $T_{cheat}$ | Time when coordinator 204, 206 is compromised to cheat (passively or actively) |
| $T_{act}$ | Time during which coordinator 204, 206 is actively cheating |
| $T_{nodetect}$ | Time period when coordinator 204, 206 actively cheats without detection |

Some of the output parameters measured the impact on security, while others measured the impact on overhead. The parameters were split into two categories: (1) security parameters and (2) overhead parameters.

Of the security parameters, the key parameters were $T_{cheat}$ and $T_{act}$, where $T_{cheat}$ and $T_{act}$ are the time the coordinator 204, 206 is conducting a cheat and an active cheat respectively. Also measured was $T_{nodetect}$, which is the time the coordinator would be cheating in the absence of cheat detection. The metric of $$1 - \frac{T_{cheat}}{T_{nodetect}}$$

gave the fraction of time saved due to cheat detection.

There were two kinds of overhead parameters. One kind of overhead was caused by extra messages sent by the CAP 202 and coordinator 204, 206 due to coordinator moves, of which $C_{xfer\_CAP} + C_{xfer\_COORD}$ gave the total number. The other was caused by extra messages sent by the CAP 202, coordinator 204, 206, and clients 104 due to cheat detection, of which $C_{cheat}$ gave the total number.

In order to study the performance of ACORN, CAP-choice was used for the moving coordinator scheme as the representative for ACORN to compare to the static coordinator scheme. This was because CAP-choice is the most secure of the ACORN instances and one goal was to find out the cost of providing the most security. The benefit of ACORN without cheat detection mechanisms was studied first and then various cheat detection mechanisms were studied. Experiments that showed the benefit of moving (without any cheat detection) versus the static coordinator approach were conducted first.

Varying Leave Rate

Figure 8:
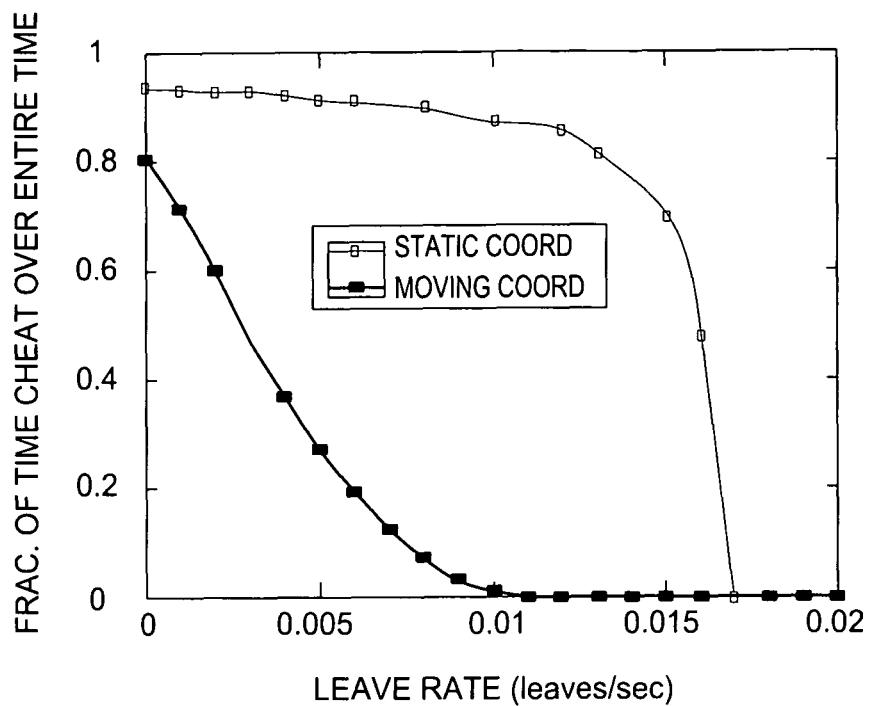
FIG. 8 is a chart showing cheat time versus leave rate.

FIG. 8 is a chart 800 that shows fraction of cheat time as the leave rate varied with a fail rate fixed at a default value of 0.0005 node failures per second. As the leave rate increased, the performance gain of ACORN increased, beginning with 16%, when there were no leaves, to a nearly 100% reduction of $T_{cheat}$ at a leave rate of 0.01 per second. This was because the attacker had to spend $t_{find} + t_{install}$ to begin to cheat every time a new coordinator 204, 206 was elected. With the static coordinator scheme, extended cheat kept the $t_{cheat}$ relatively static from 0.001 to 0.01 leaves per second. As the leave rate increased beyond that, the static coordinator scheme started to close the gap, because the attacker did not even have sufficient time to install the spyware or malware for an initial compromise to cheat.

Figure 9:
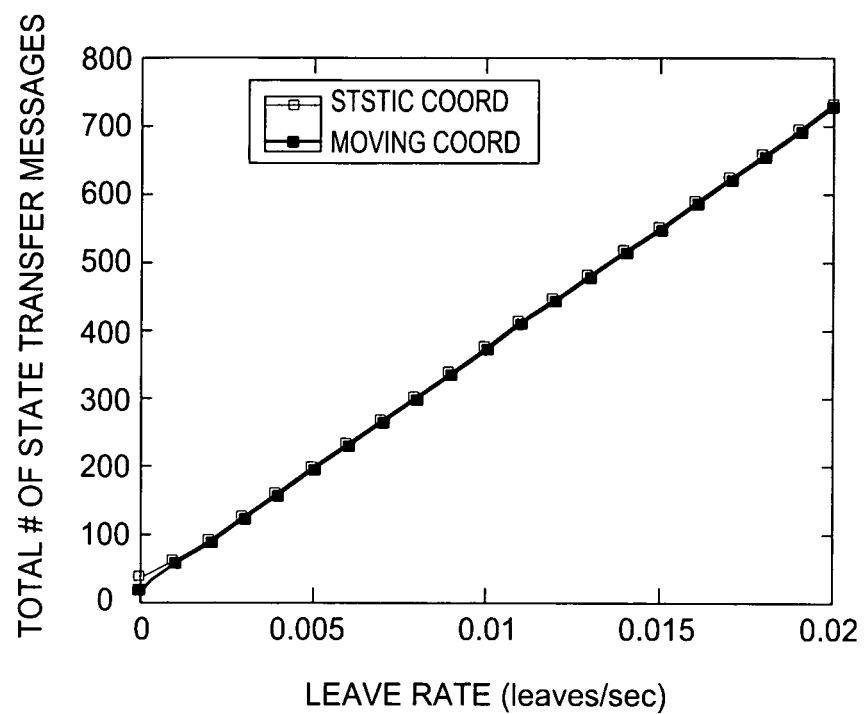
FIG. 9 is a chart showing message overhead versus leave rate.

FIG. 9 is a chart 900 showing message overhead versus leave rate. These messages were the result of transfer of the regional state from (1) the central server 108 to the new coordinator 204, 206 in the static scheme and (2) from $C_{old}$ to $C_{new}$ in ACORN. Because the transmission of these messages was identical for both schemes, it was seen that ACORN was almost identical in overhead compared to the static coordinator scheme. This results justified deployment of ACORN in P2P networks.

Varying Fail Rate

Figure 10:
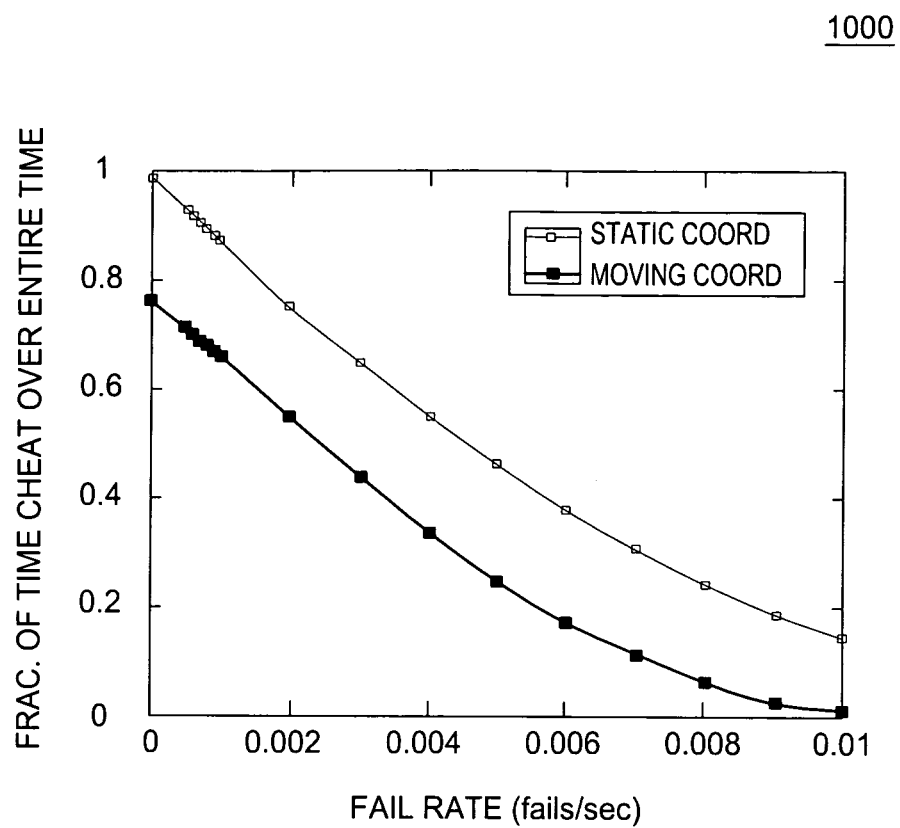
FIG. 10 is a chart showing cheat time versus fail rate.

FIG. 10 is a chart 1000 that shows the fraction of cheat time as the fail rate varied with the leave rate fixed at the default value of 0.001 leaves per second. As the fail rate increased, the performance gain of ACORN increased, beginning with a 22% reduction in $T_{cheat}$ when there were no failures to nearly 100% reduction of $T_{cheat}$ at the fail rate of 0.01 per second. At high failure rates, the performance of the static coordinator improved, because it became increasingly difficult to trigger a cheat due to the $t_{lost} + t_{install}$ overhead incurred. However, for ACORN, high failure rates combined with the coordinator moves made it even more difficult for the attacker, sustaining the improvement over the static scheme. Again, the total number of state transfer messages was very similar in both the static scheme and ACORN as fail rate varied. These results were encouraging, because enhanced security is provided via a reduced $T_{cheat}$, without adding message overhead.

Varying Move Interval

A key parameter for ACORN was $t_{move}$, the time interval between two consecutive coordinator moves. The security gain of ACORN was determined by $t_{move}$ along with leave rate and fail rate. The effect of $t_{move}$ under two representative network scenarios was examined: (1) high fluctuation and (2) normal fluctuation. High fluctuation was due to the high leave rate of 0.01 leaves per second. Normal fluctuation was due to the default leave rate pf 0.001 leaves per second and the default fail rate of 0.0005 node failures per second.

Figure 11:
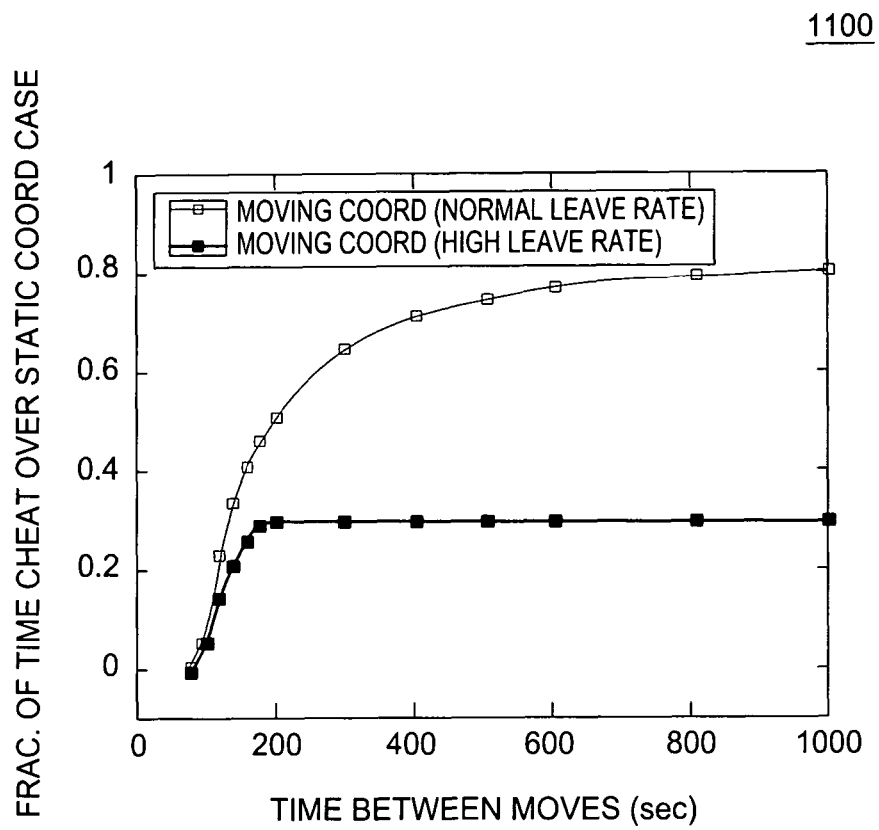
FIG. 11 is a chart showing cheat time versus move interval.

FIG. 11 is a chart 1100 that shows the ratio of $T_{cheat}$ for ACORN to $T_{cheat}$ for the static case, while varying $t_{move}$. Under the normal fluctuation scenario, as $t_{move}$ increased, the gain for ACORN decreased from 100% saving with $t_{move}$=80 s to 55% saving with $t_{move}$=180 s. Moving quicker resulted in less chance for an attacker to launch spyware or malware to cause the coordinator 204, 206 to cheat. Even when $t_{move}$=1000 s, ACORN still reduced $T_{cheat}$ by 21% compared to the static case. Under the high fluctuation scenario, as $t_{move}$ increased, the gain for ACORN decreased much slower, $t_{move}$=200 s lead to a 70% reduction, after which the reduction remained at the same level as $t_{move}$ increased. A leave did not shorten $T_{cheat}$ in the static case; however, it did shorten $T_{cheat}$ in ACORN. In other words, with a fixed move interval, a higher leave rate shortened $T_{cheat}$. A high leave rate was used to represent a high fluctuation scenario and the analogous high fail rate scenario was similar.

Figure 12:
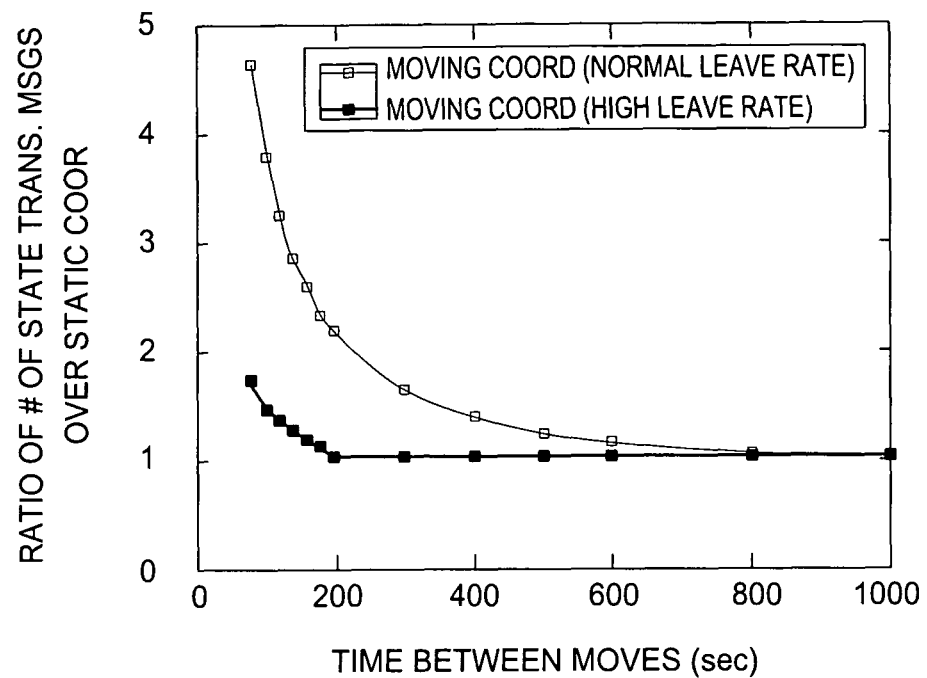
FIG. 12 is a chart showing message overhead versus move interval.

FIG. 12 is a chart 1200 showing message overhead versus move interval. The fraction of state transfer messages in ACORN over the messages in the static case is shown in FIG. 12. With the normal leave rate of 0.001/s, when the move interval $t_{move}$=80 s, the overhead was around 4.5 times that of the static case. However, the overhead dropped exponentially as $t_{move}$ increased. It was an encouraging sign that when $t_{move}$=600 s, the overhead was almost identical to the static case, with a reduction of 22% in the $T_{cheat}$ metric.

At the high leave rate of 0.01/s, the extra messages were negligible, because both the static case and ACORN sent the same number of messages due to coordinator leave events. As a consequence, the overhead of ACORN dropped from around 1.75 times to being identical to the static case for when $t_{move}$=180 s. However, ACORN offered 70% reduction in $T_{cheat}$ in this case with no message overhead. This suggested that ACORN did exceptionally well in a highly fluctuating P2P environment, which would be the norm rather than the exception.

Cheat Detection

In order to study the security gain and message overhead of the K-window and checkpointing cheat detection mechanisms, the default values of fail rate, $R_f$=0.0005/s, and move interval, $t_{move}$=10 min were used. For the normal fluctuation scenario, the default leave rate, $R_l$=0.001/s was used. For the high fluctuation scenario, a high leave rate, $R_l$=0.01/s was used. Based on the default leave rate with a move interval of 10 minutes in FIG. 19, it was seen that the number of state transfer messages amounted to 64, each of size 12 Kbytes. Thus, the overhead for the baseline ACORN operation was approximately 768 Kbytes. One goal was to evaluate the additional impact of K-window and checkpointing on the baseline overhead.

Figure 13:
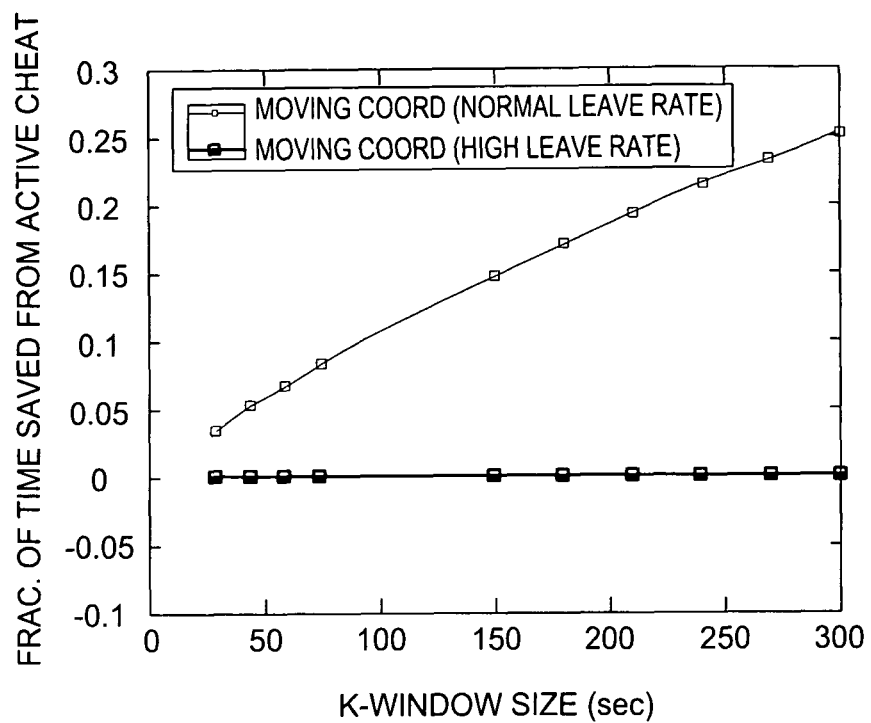
FIG. 13 is a chart showing cheat time savings versus K-window interval.

FIG. 13 is a chart 1300 showing cheat time savings versus K-window interval. FIG. 13 shows the performance of the K-window by plotting the fraction of $$1 - \frac{t_{cheat}}{t_{nodetect}},$$

which was the fraction of time save due to cheat detection using K-window. With the normal leave rate, as the window size increased from 30 s to 300 s, the saving increased from 3.2% to 25%. With the high leave rate, the time savings were negligible. The reason was that with high leave rates, the spyware and malware were harder to install to compromise the coordinators 204, 206 to cheat, because each takes a finite duration, by which time, the node could leave. The actual time that a coordinator 204, 206 could cheat was small, therefore making it harder to achieve any benefits using cheat detection.

Figure 14:
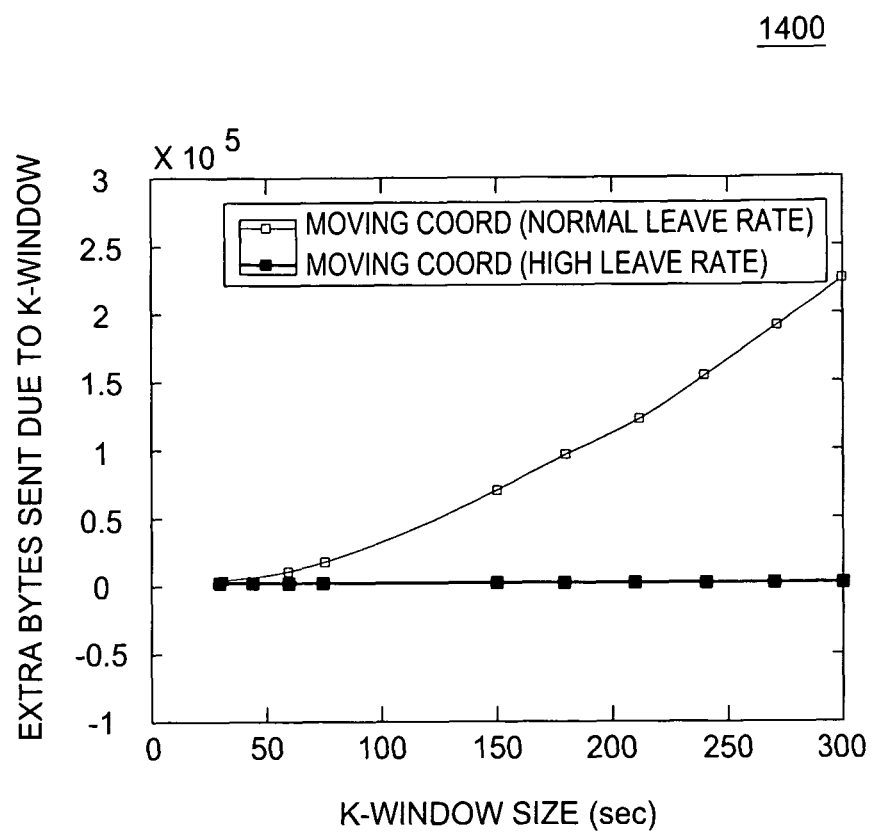
FIG. 14 is a chart showing message overhead versus K-window interval.

FIG. 14 is a chart showing message overhead versus K-window interval. FIG. 14 shows the associated overhead in terms of extra message bytes sent due to K-window, including regional state transfer messages, because of forced moves upon successful cheat detection. This was the total overhead independent of the number of players, which indicates scalability. The metrics was in bytes, because there were different messages sent as part of each cheat detection mechanism. The extra messages were over and above those sent due to moving coordinator functionality.

For the same range of window size of [30 s, 300 s], the overhead values ranged from 2.5 Kbytes all the way to 227 Kbytes, leading to an extra overhead over baseline ACORN, ranging from 0.3% to 29.5%. An operating sweet spot from this range was a window size of around 150 seconds with 15% savings in cheat time and an overhead of 9.1%.

With the high leave rate, the extra bytes sent by ACORN were negligible, because the coordinator 204, 206 was forced to move more because of the leave events, instead of move events due to successful cheat detection.

In the alternative mode of operation, when the CAP 202 does the verification of the $\Delta$'s as opposed to the coordinator 204, 206 doing it, the overhead was halved, justifying the increased complexity of this mode of operation.

Checkpointing

Figure 15:
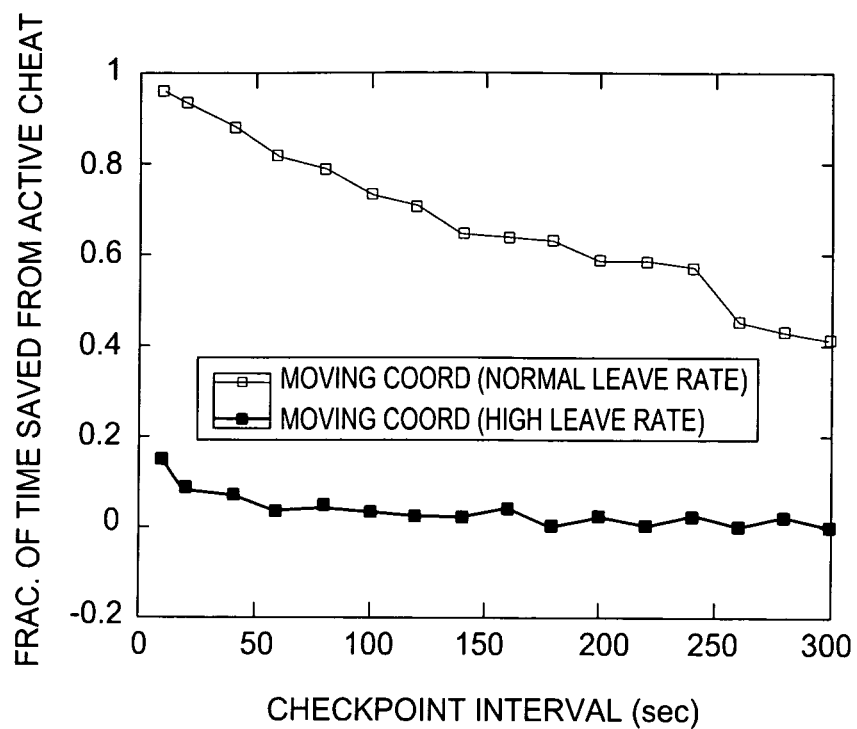
FIG. 15 is a chart showing cheat time saving versus checkpoint interval.

FIG. 15 is a chart showing cheat time saving versus checkpoint interval. FIG. 15 shows the performance of checkpointing cheat detection. Under the normal leave rate, as $t_{chkperiod}$ increased from 10 s to 300 s, the time savings from active cheat decreased from 93% only to 41%. However, the x-axis had an inverse relation to performance, because the checkpoint interval was plotted where the shorter the interval, the better the performance as opposed to the results from K-window.

Figure 16:
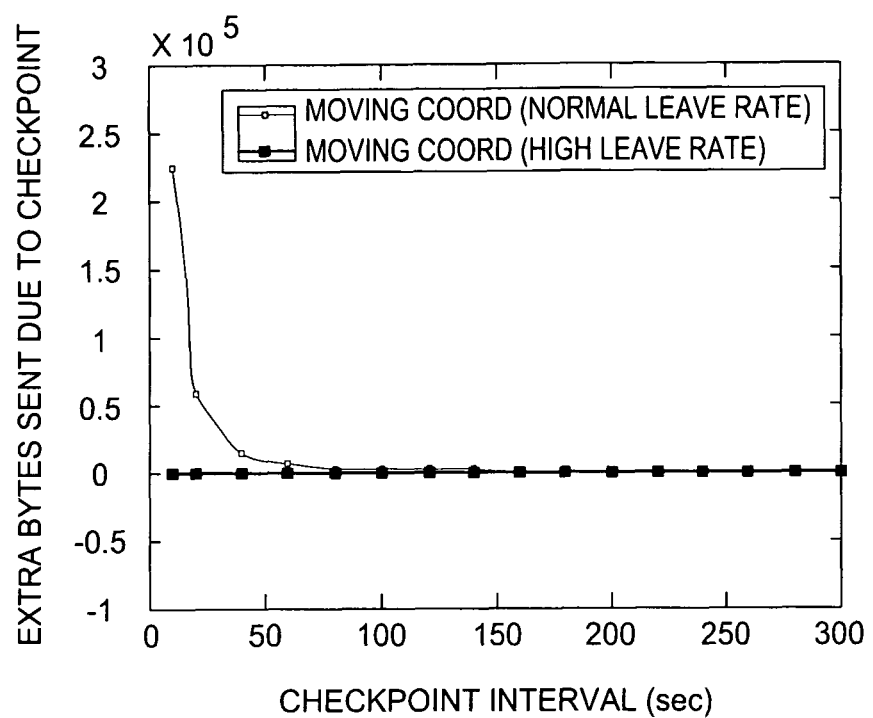
FIG. 16 is a chart showing message overhead versus checkpoint interval.

FIG. 16 is a chart showing message overhead versus checkpoint interval. FIG. 16 shows the message overhead in bytes per user. When the frequency was high with $t_{chkperiod}$=10 s, the overhead was nearly 225 Kbytes per user. For the gaming configuration with 1000 clients 104, requiring a majority of checkpoint responses for confirmation would have meant the overhead would have been potentially multiplied by 500, which made this interval infeasible in practice in spite of the attractive 97% reduction in active cheating time, $T_{act}$. However, at the other end of the spectrum, checkpointing at 300 s, lead to a more manageable overhead of 27% (0.43 Kbytes per user multiplied by 500) over the baseline ACORN, while providing a gain of 41%.

It was not necessary to rely on a majority of clients 104 for verifying cheat detection. One approach was to do a random sampling of a much smaller subset of nodes for checkpointing, reducing the overhead by at least an order of magnitude. A follow-up to this approach was for the game manufacturer to deploy random trusted nodes that behave as legitimate players to form the subset. These clients 104 would have been security hardened to make it more difficult to compromise these players relative to the general population. This allowed checkpointing to be a high-performance security mechanism in practice.

Checkpointing was seen to provide substantial gains at minimum added overhead, provided the checkpointing set of players was small. The flexibility of the interval between checkpoints suggested its applicability to different P2P applications. K-window provided reasonable gains in scenarios where the overhead of checkpointing rendered its deployment infeasible, especially in adverse or hostile environments, where nodes can actively chat.

Exemplary embodiments are motivated in part by the problem of providing network-based security for coordinator-based P2P architectures. Exemplary embodiments of the ACORN architecture with a comprehensive suite of techniques that explore the performance and security tradeoff are provided. A new moving coordinator mechanism that enables coordinator functionality to be moved across different candidate nodes in order to mitigate the compromise of a single, otherwise static coordinator is provided. Two new cheat detection mechanisms that can be adapted differently based on security constraints of the application and can detect cheats early such that when coupled with moving, provide an effective defense against network-level cheating and compromise. An evaluation suggested that these mechanisms were feasible, providing a tunable knob that allowed them to be deployed under different network conditions.

Figure 17:
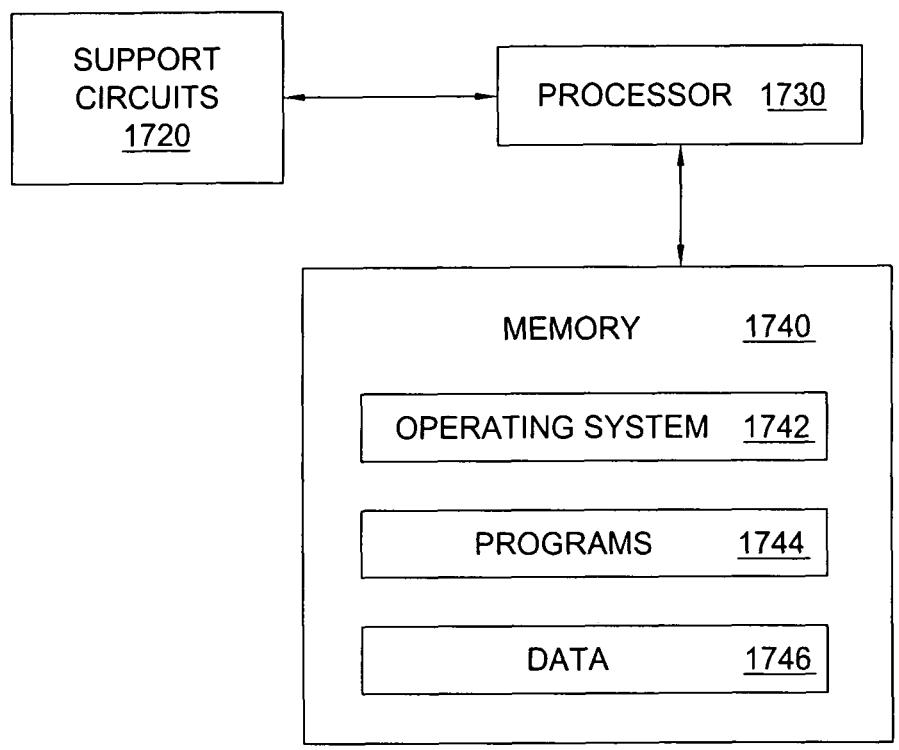
FIG. 17 is a high level block diagram showing a computer.

FIG. 17 is a high level block diagram showing a computer. The computer 1700 may be employed to implement embodiments of the present invention. The computer 1700 comprises a processor 1730 as well as memory 1740 for storing various programs 1744 and data 1746. The memory 1740 may also store an operating system 1742 supporting the programs 1744.

The processor 1730 cooperates with conventional support circuitry such as power supplies, clock circuits, cache memory and the like as well as circuits that assist in executing the software routines stored in the memory 1740. As such, it is contemplated that some of the steps discussed herein as software methods may be implemented within hardware, for example, as circuitry that cooperates with the processor 1730 to perform various method steps. The computer 1700 also contains input/output (I/O) circuitry that forms an interface between the various functional elements communicating with the computer 1700.

Although the computer 1700 is depicted as a general purpose computer that is programmed to perform various functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware, or a combination thereof.

The present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media within a computing device operating according to the instructions.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method for providing network-based security in a network including a coordinator access point (CAP), a set of candidate coordinator nodes and a plurality of clients, the method comprising:

moving a coordinator functionality between members of the set of candidate coordinator nodes without notifying the clients, wherein the coordinator functionality is scheduled to be moved between members of the set of candidate coordinator nodes periodically, each of the candidate coordinator nodes capable of hosting a coordinator functionality, the coordinator functionality adapted for handling messages associated with the clients; and wherein the coordinator access point (CAP) enables communication between clients and coordinator nodes and dynamically implements network security measures including acting as a trusted intermediary between clients and coordinator nodes.

2. The method of claim 1, further comprising:
performing cheat detection.

3. The method of claim 2, wherein cheat detection is performed by using a k-window mechanism.

4. The method of claim 2, wherein cheat detection is performed by using a checkpointing mechanism.

5. The method of claim 1, wherein moving the coordinator functionality is triggered by one of the following: a move event, a leave event, or a fail event.

6. The method of claim 1, further comprising:
generating an ID number; and
mapping the ID number to an address of a new coordinator node, without notifying the clients;
wherein the coordinator functionality is moved to the new coordinator node.

7. A system for providing network-based security in a network, comprising:

a central server for providing a plurality of services;

a plurality of clients, each client being capable of connecting to the central server to access one of the services, each client being capable of joining and leaving the network;

a set of candidate coordinator nodes, wherein each of the candidate coordinator nodes is capable of hosting a coordinator functionality in the network including acting as a trusted intermediary between clients and coordinator nodes, wherein the coordinator functionality is adapted for handling messages associated with the clients; and a coordinator access point (CAP) for enabling communication between clients and coordinator nodes and moving the coordinator functionality between members of the set of candidate coordinator nodes without notifying the clients, wherein the coordinator functionality is scheduled to be moved between members of the set of candidate coordinator nodes periodically.

8. The system of claim 7, wherein the services provided by the central server are gaming services and further wherein the clients represent game players.

9. The system of claim 7, further comprising:
a plurality of transit nodes for routing in the network.

10. The system of claim 7, further comprising:
a coordinator mapping table (CMT) for mapping a plurality of ID sequence numbers to a plurality of keys used for routing messages in the network; and
a coordinator key table (CKT) for mapping the keys to a plurality of Internet protocol (IP) addresses of the respective candidate coordinator nodes.

11. The system of claim 10, wherein the CAP:
selects the set of candidate coordinator nodes;
assigns a unique set of the keys to each candidate coordinator node in the set of candidate coordinator nodes; and
stores, in the CKT, a mapping of the unique sets of keys to the respective candidate coordinator nodes to which the unique sets of keys have been assigned.

12. The system of claim 10, wherein the CAP constructs the CMT and multicasts the CMT to all the clients.

13. The system of claim 10, wherein the CAP generates a seed and multicasts the seed to all the clients.

14. The system of claim 13, wherein each client uses the seed to generate the ID sequence numbers.

15. The system of claim 10, wherein the clients do not know the IP address of a current coordinator node.

16. The system of claim 10, wherein the clients use one of the keys to forward messages to a current coordinator node.

17. A non-transitory computer readable storage medium storing instructions, which, when executed by a processor, cause the processor to perform a method for providing network-based security in a network including a set of candidate coordinator nodes and a plurality of clients, the method comprising:

moving a coordinator functionality between members of the set of candidate coordinator nodes without notifying the clients, wherein the coordinator functionality is scheduled to be moved between members of the set of candidate coordinator nodes periodically, each of the candidate coordinator nodes capable of hosting a coordinator functionality including acting as a trusted intermediary between clients and coordinator nodes, the coordinator functionality adapted for handling messages associated with the clients; and wherein a coordinator access point (CAP) enables communication between clients and coordinator nodes.

18. The non-transitory computer readable storage medium of claim 17, further comprising:
performing cheat detection.

19. The non-transitory computer readable storage medium of claim 17, wherein cheat detection is performed by using a k-window mechanism.

20. The non-transitory computer readable storage medium of claim 17, wherein cheat detection is performed by using a checkpointing mechanism.

* * * * *